United States Patent
Oh et al.

(10) Patent No.: US 9,582,853 B1
(45) Date of Patent: Feb. 28, 2017

(54) METHOD AND SYSTEM OF DEMOSAICING BAYER-TYPE IMAGE DATA FOR IMAGE PROCESSING

(71) Applicant: INTEL CORPORATION, Santa Clara, CA (US)

(72) Inventors: Jong Dae Oh, Folsom, CA (US); Vijay Sundaram, Folsom, CA (US); Yi-Jen Chiu, San Jose, CA (US); Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/816,951

(22) Filed: Aug. 3, 2015

(51) Int. Cl.
| | | |
|---|---|---|
| *G06K 9/00* | (2006.01) | |
| *G06T 3/40* | (2006.01) | |
| *G06T 7/00* | (2006.01) | |

(52) U.S. Cl.
CPC .......... *G06T 3/4015* (2013.01); *G06T 3/4007* (2013.01); *G06T 7/0085* (2013.01); *G06T 2207/10024* (2013.01)

(58) Field of Classification Search
CPC .. G06K 7/10702; G06K 7/10801; G06K 9/00; G06K 2007/10485; G06T 3/4007; G06T 3/4015; G06T 5/002; G06T 5/009; G06T 5/10; G06T 5/20; G06T 7/0085; G06T 7/20; G06T 2207/20012; G06T 2207/20024; G06T 2207/20182; G06T 2207/20201; H04N 1/00132; H04N 1/00161; H04N 1/00167; H04N 1/00172; H04N 1/00175; H04N 1/32128; H04N 1/46; H04N 5/23229; H04N 5/2628; H04N 9/00; H04N 9/045; H04N 9/07; H04N 9/46; H04N 9/64; H04N 2201/3205; H04N 2201/3274; H04N 2201/3278; H04N 2209/046
See application file for complete search history.

(56) References Cited

U.S. PATENT DOCUMENTS

| | | | | |
|---|---|---|---|---|
| 7,376,288 | B2 * | 5/2008 | Huang | G06T 3/4015 348/272 |
| 7,502,505 | B2 * | 3/2009 | Malvar | G06T 3/4015 382/162 |
| 7,755,682 | B2 * | 7/2010 | Lin | H04N 9/045 348/222.1 |
| 8,131,067 | B2 * | 3/2012 | Lukac | H04N 9/045 348/222.1 |
| 8,452,090 | B1 * | 5/2013 | Brunner | G06K 9/00 382/167 |
| 9,210,391 | B1 * | 12/2015 | Mills | H04N 9/07 |
| 9,219,870 | B1 * | 12/2015 | Mills | H04N 5/2628 |
| 2007/0229684 | A1 | 10/2007 | Lin | |
| 2007/0247530 | A1 | 10/2007 | Takahasi et al. | |
| 2010/0195908 | A1 * | 8/2010 | Bechtel | H04N 5/213 382/167 |

(Continued)

OTHER PUBLICATIONS

Malvar et al., "High-Quality Linear Interpolation for Demosaicing of Bayer-Patterned Color Images," Microsoft Research, May 2004, 4 pages.

(Continued)

*Primary Examiner* — Jose Cuoso
(74) *Attorney, Agent, or Firm* — Green, Howard & Mughal, LLP

(57) ABSTRACT

Techniques related to demosaicing Bayer-type image data for image processing.

25 Claims, 12 Drawing Sheets

(56) References Cited

U.S. PATENT DOCUMENTS

| | | | |
|---|---|---|---|
| 2011/0032396 A1 | 2/2011 | Park et al. | |
| 2011/0273593 A1 | 11/2011 | Cohen et al. | |
| 2013/0077858 A1* | 3/2013 | Peng .................... | G06T 3/4015 |
| | | | 382/162 |
| 2016/0110843 A1* | 4/2016 | Mills .................... | H04N 5/2628 |
| | | | 348/241 |

OTHER PUBLICATIONS

International Search Report and Written Opinion, mailed Oct. 19, 2016, for PCT Patent Application No. PCT/US16/41009.

\* cited by examiner

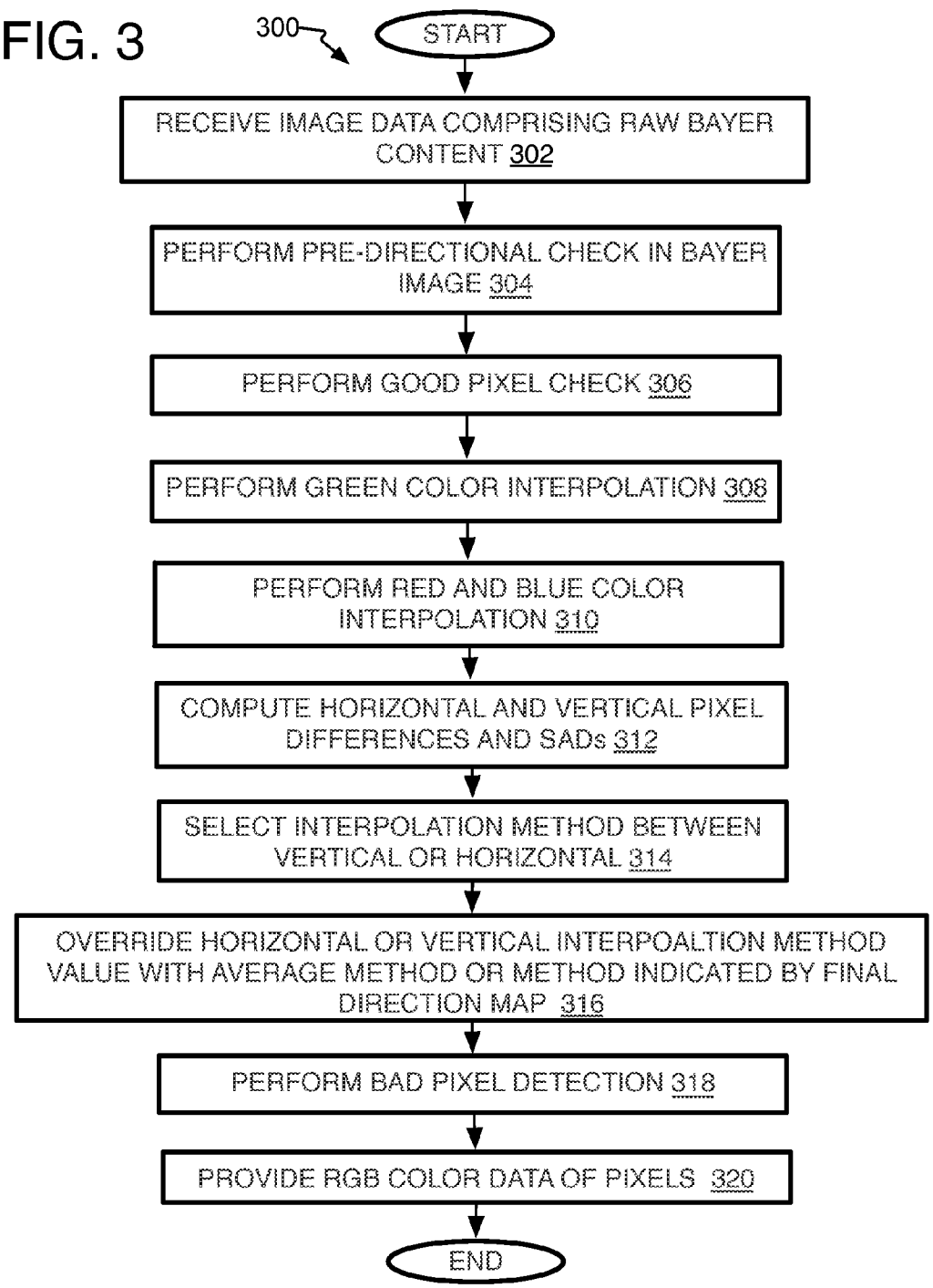

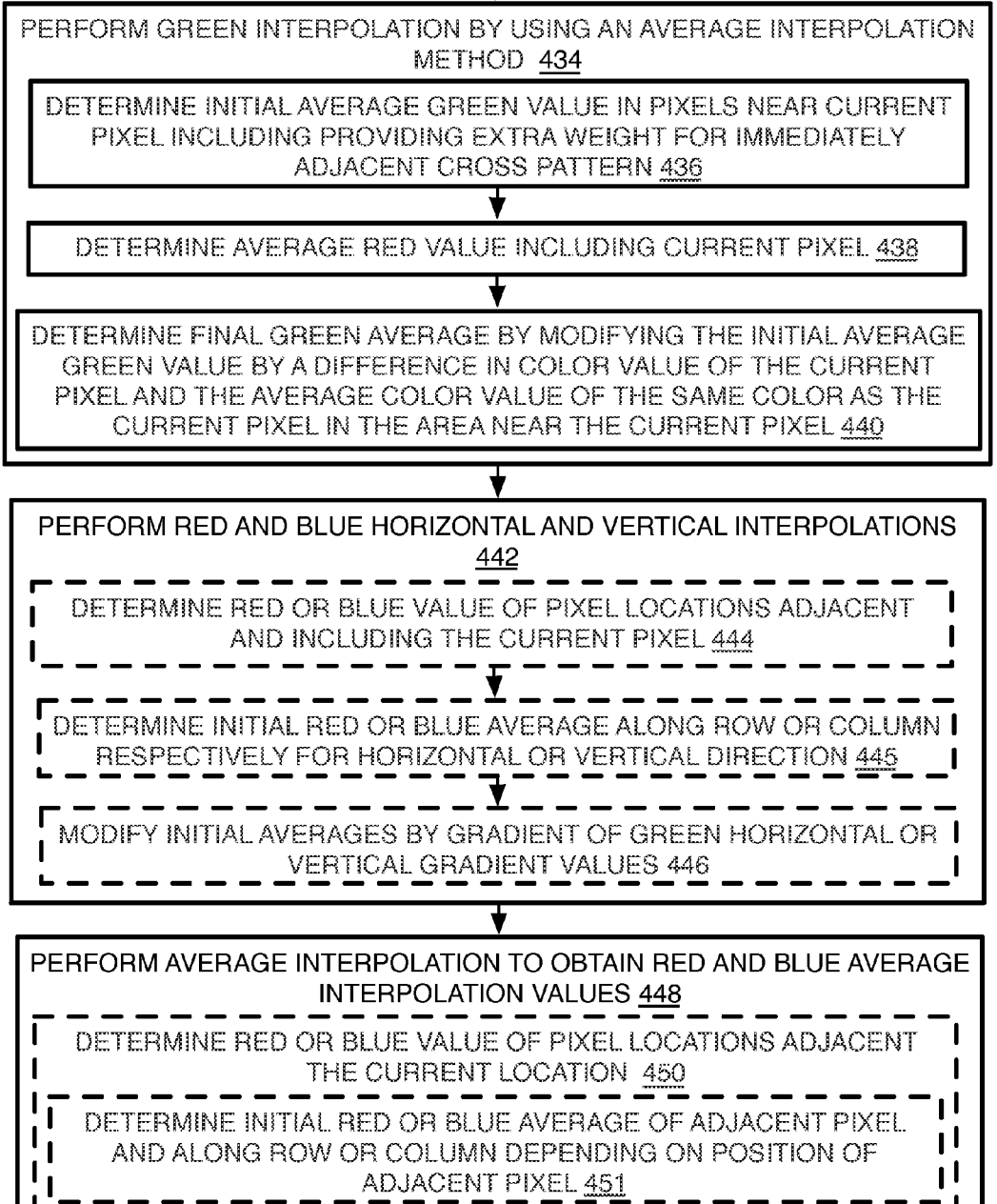

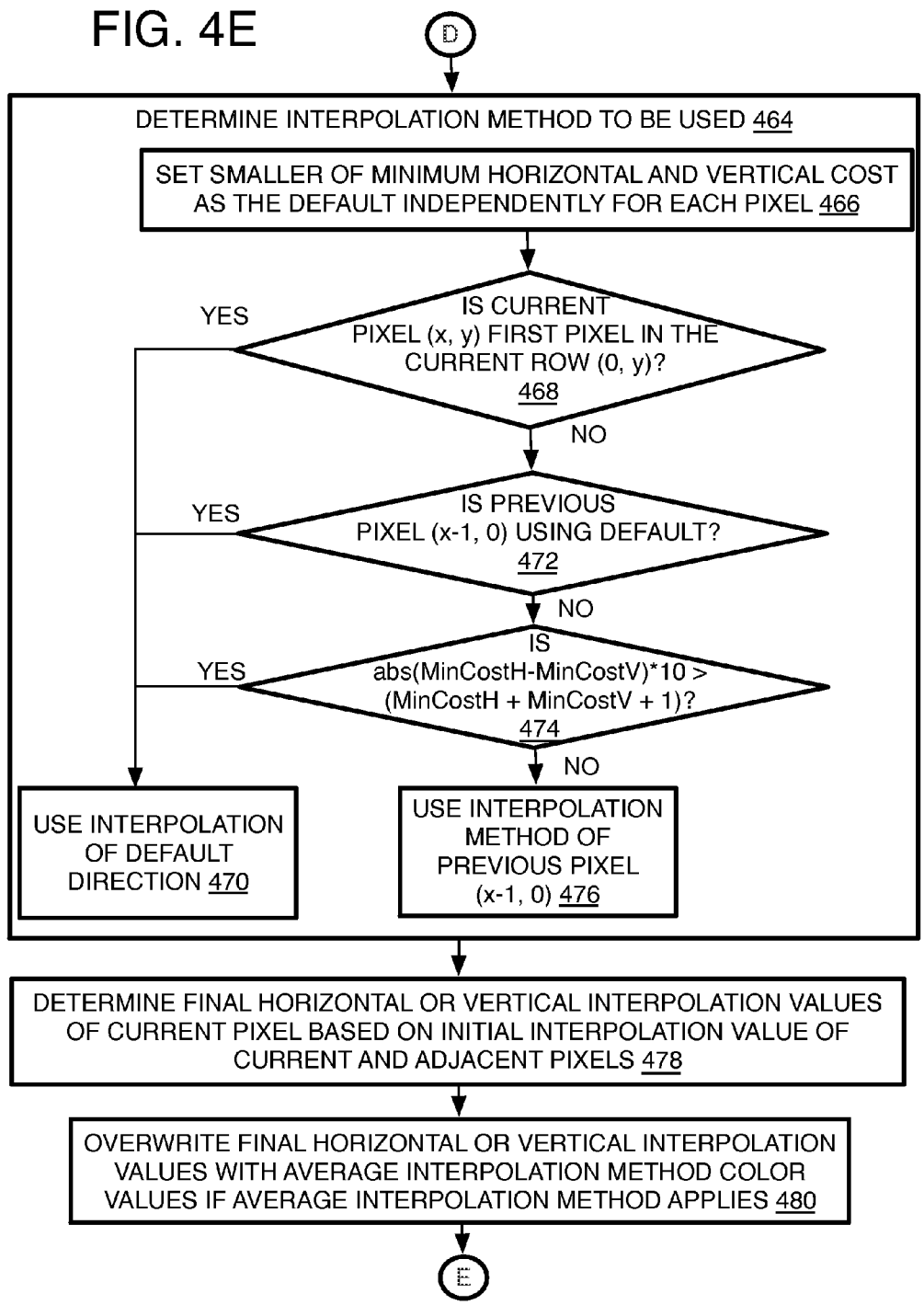

METHOD AND SYSTEM OF DEMOSAICING BAYER-TYPE IMAGE DATA FOR IMAGE PROCESSING

BACKGROUND

Raw image data captured from an image capture device such as a video or still picture camera often is conventionally captured using a Bayer filter mosaic which is a color filter array (CFA) arranging red, green, and blue color filters on a square grid of photosensors. The Bayer filter is used in many digital image sensors to create a color image. The filter pattern for one example Bayer filter is 50% green, 25% red and 25% blue. In other words, for every 2×2 group of pixels, two diagonally opposed pixels provide a green intensity or hue value, while one of the other pixels provides a red value, and the fourth pixel provides a blue value.

In order to form or display images from image data obtained using a Bayer filter, demosaicing algorithms are used to determine the missing color components, whether red, green, or blue component values, so that each pixel has red, green, and blue (RGB) values to combine the components together to form a specific color at the pixel. This is typically performed by using some form of bilinear interpolation using color values at surrounding pixels and of the same color to determine the color value for a current pixel. The conventional demosaicing algorithms, however, may result in color artifacts due to mis-registration of the colors, and therefore the inability to provide a high quality image.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 3 is another flow chart of a method of demosaicing Bayer-type image data for image processing;

FIGS. 4A-4F is a flow chart of a detailed method of demosaicing Bayer-type image data for image processing;

DETAILED DESCRIPTION

Figure 1:
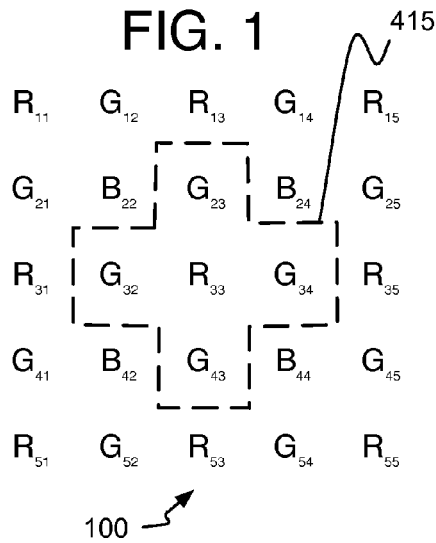
FIG. 1 is a schematic diagram of a color pattern of a pixel grid with pixels missing color values.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, tablets with multiple cameras, webcams, video cameras, video game panels or consoles, set top boxes, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of demosaicing Bayer image data for image processing.

As mentioned above, the conventional format of a raw image from a camera is a Bayer filter pattern which has only one color component per pixel (referred to herein as the Bayer domain) such as RG-GB so that for every 2×2 set of pixels, two diagonally opposing pixels have green values, while one of the remaining pixels has a red value, and the last pixel has a blue value (as shown on FIG. 1). In order to reconstruct a full color image (i.e. a full set of RGB color triples for each pixel) and predict the other two missing color components for each pixel and from the spatially under sampled color channels, the conventional method uses bilinear interpolation or other more complicated algorithms using neighbor pixel information with values for the same color being sought for a current pixel. These methods often cannot preserve maximum image resolution without introducing false color artifacts. It should be noted that the terms color and color component are used interchangeably herein to refer to the three R, G, and B color components.

To resolve these issues, a demosaic interpolation algorithm as disclosed herein uses other available information in the image Bayer domain and interpolation domain (where individual pixels have initial RGB values). Particularly, the demosaic method and system herein factors in edge confidence while computing the missing RGB color values for each pixel, and by determining and analyzing the directions of color value gradients. The most accurate interpolation method from a number of available interpolation methods may then be selected for use at particular individual pixel locations, and depending on the edge confidence level for a pixel.

Particularly, the present demosaicing method and system determines an edge confidence for a pixel location in both the Bayer domain and the interpolation domain. If there is insufficient edge confidence found at a pixel in the Bayer domain, the system may make the final decision in the interpolation domain. The present method and system attempts to select the best interpolation direction at a pixel granularity after carefully weighing decisions in both the Bayer and interpolation domains in order to fully utilize information from each domain and make the decision based on a domain which had better confidence. Once the best interpolation direction is settled, the final raw RGB values for individual pixels may be used for further image processing and ultimate display or storage of the image.

To perform these tasks and interpolate two missing color components for a pixel, the present solution first performs a predetermination operation in the Bayer domain to determine an edge confidence of an edge direction for individual pixels (also referred to as a first edge determination). In the Bayer domain, the best interpolation method may be selected among three candidates: average, horizontal, and vertical. The average interpolation method applies best for pixels in uniform, flat areas of color without a strong edge. The horizontal interpolation method applies best to pixels at or near a horizontal edge (or edge with a horizontal direction) and where vertical gradients in color value are greater than the horizontal gradients in color value. Likewise, the vertical interpolation method applies best to pixels at or near a vertical edge (or edge with a vertical direction) and where horizontal gradients in color value are greater than the vertical gradients in color value. Thus, in the Bayer domain, the pixels that have the appropriate edge direction and strong characteristics of one of the three interpolation methods are assigned that interpolation method. Otherwise, the pixels that are not assigned to an interpolation method (so called no decision or "no direction" pixels) during the Bayer domain are assigned to one of the interpolation methods in the interpolation domain.

In the interpolation domain, an initial color value is interpolated for multiple or each pixel using the average, horizontal, and vertical interpolation methods whether or not an interpolation method was already assigned during the Bayer domain since neighbor pixel values may be used to determine a color value for a current pixel. Either horizontal or vertical interpolation direction is chosen as the final interpolation value for these pixels. In this regard, the computations may be viewed as determining the best edge direction for a pixel, firstly, by independently creating a horizontal interpolation image and a vertical interpolation image. Then, based on the R/G/B values in the interpolation domain, it is determined whether a pixel in either horizontal or vertical image is selected as the final output. By one example, this may be the minimum cost based on the sums of pixel-to-pixel differences of cross-color differences at individual pixels, effectively performing a second edge determination for the pixels. By one form, the determination between horizontal and vertical interpolation method is made for pixels that already have their interpolation method assigned in the Bayer domain. For these pixels, the determination in the interpolation domain are overwritten (or overrode) by the use of the interpolation method selected in the Bayer domain when the edge confidence is sufficiently high.

It will be understood that some of the implementations herein may be applied to what is referred to herein as Bayer-type of image data where pixels have missing color values that need to be obtained for image processing, but are not necessarily in the exact RG-GB pattern described in the examples herein whether a different order of RGB components are in the 2×2 pattern, a pattern with a different shape or size is used, and/or colors from other color spaces than the RGB color space is used.

Figure 2:
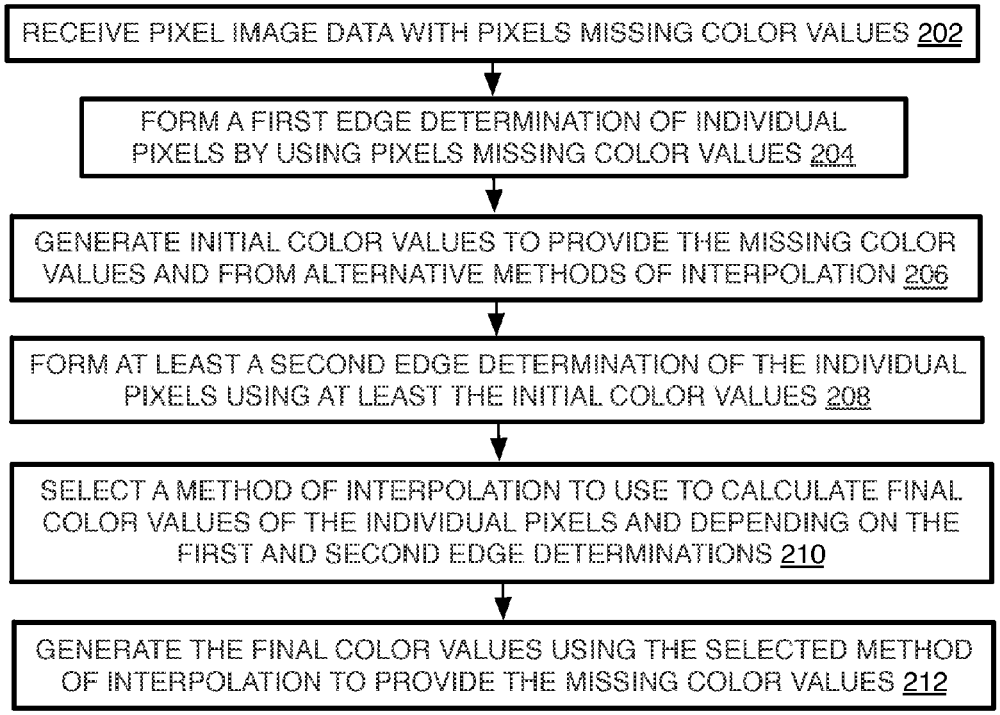
FIG. 2 is a flow chart showing a method of demosaicing Bayer-type image data for image processing.
Figure 4A:
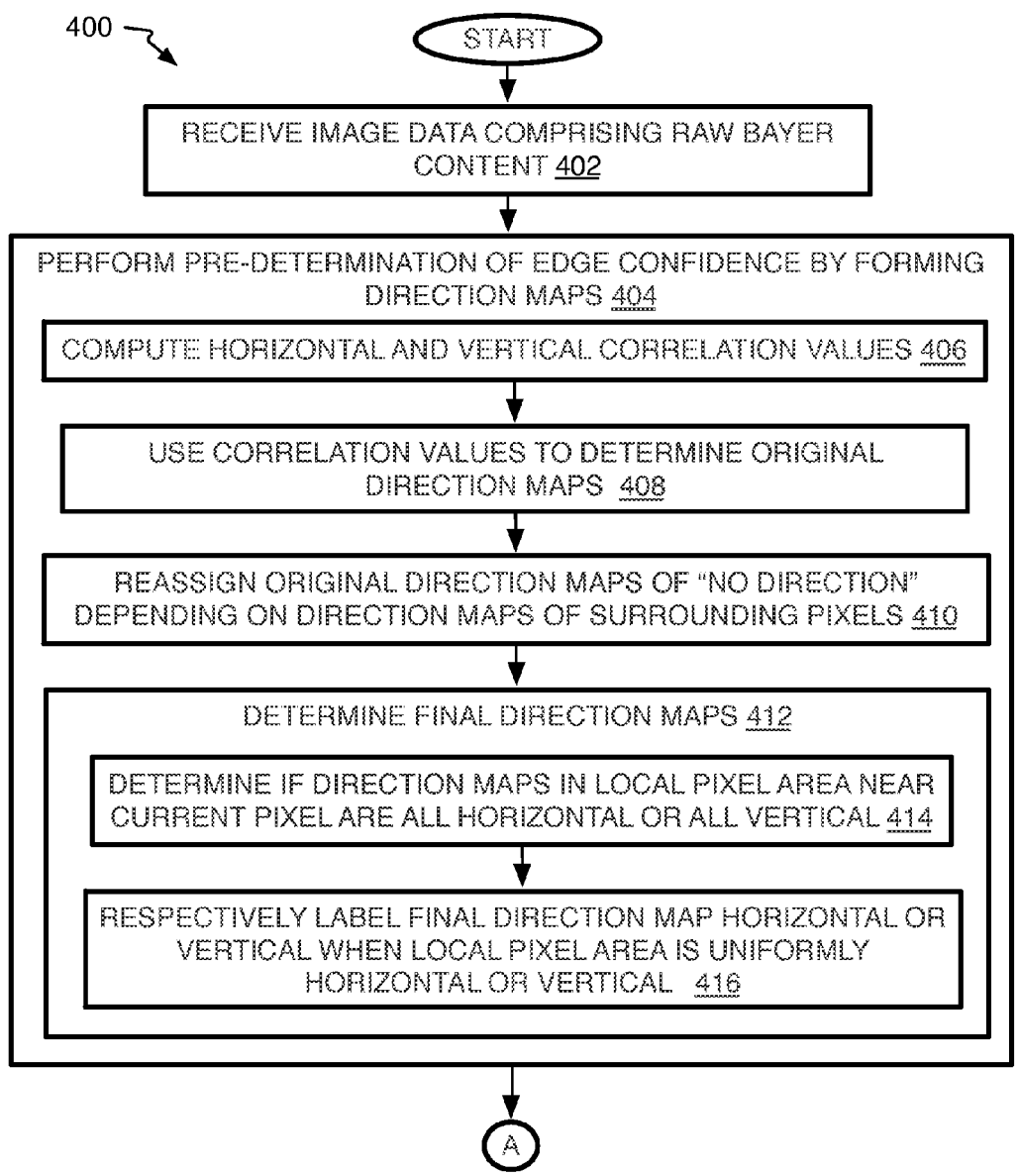
Figure 4B:
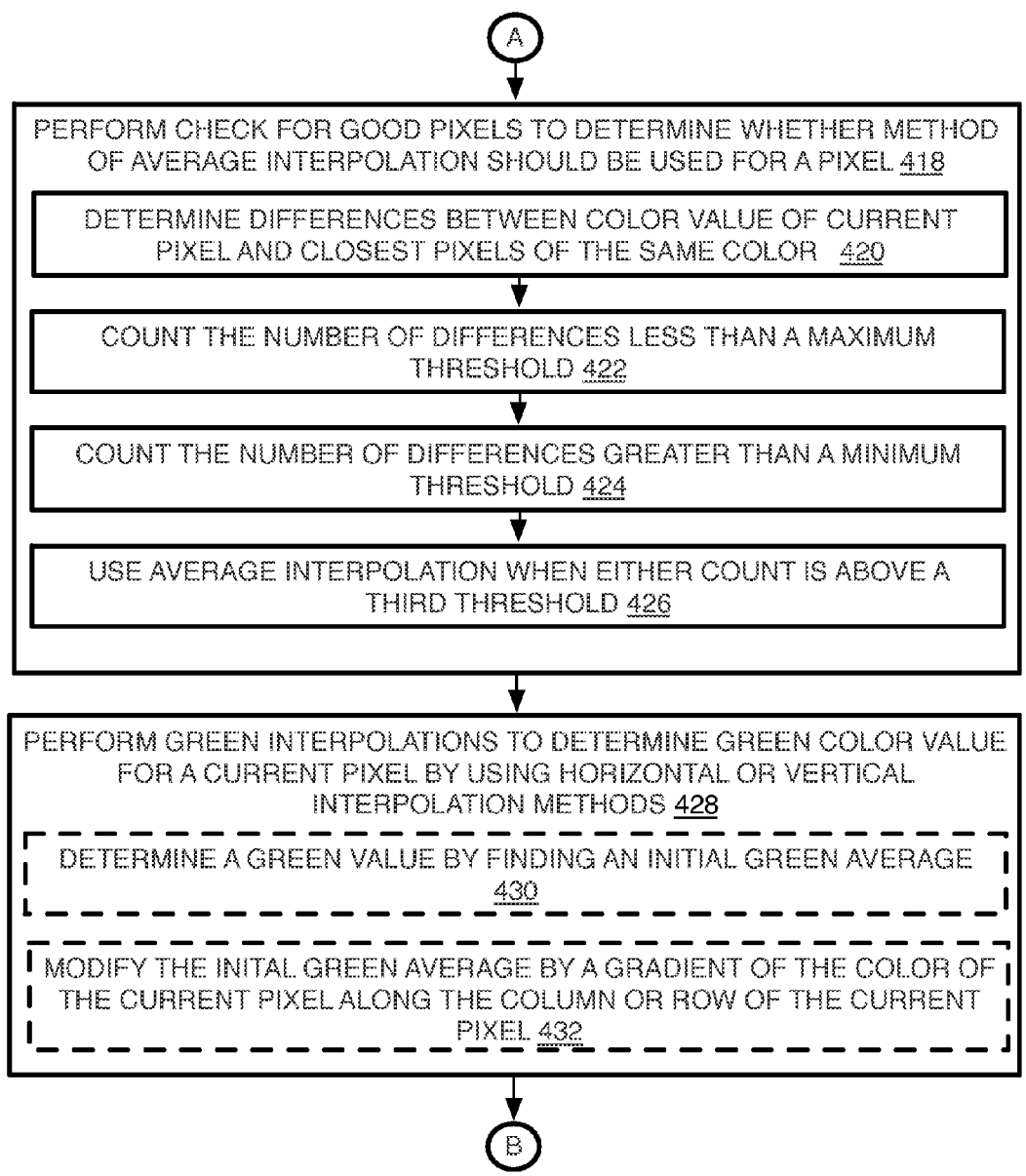
Figure 4D:
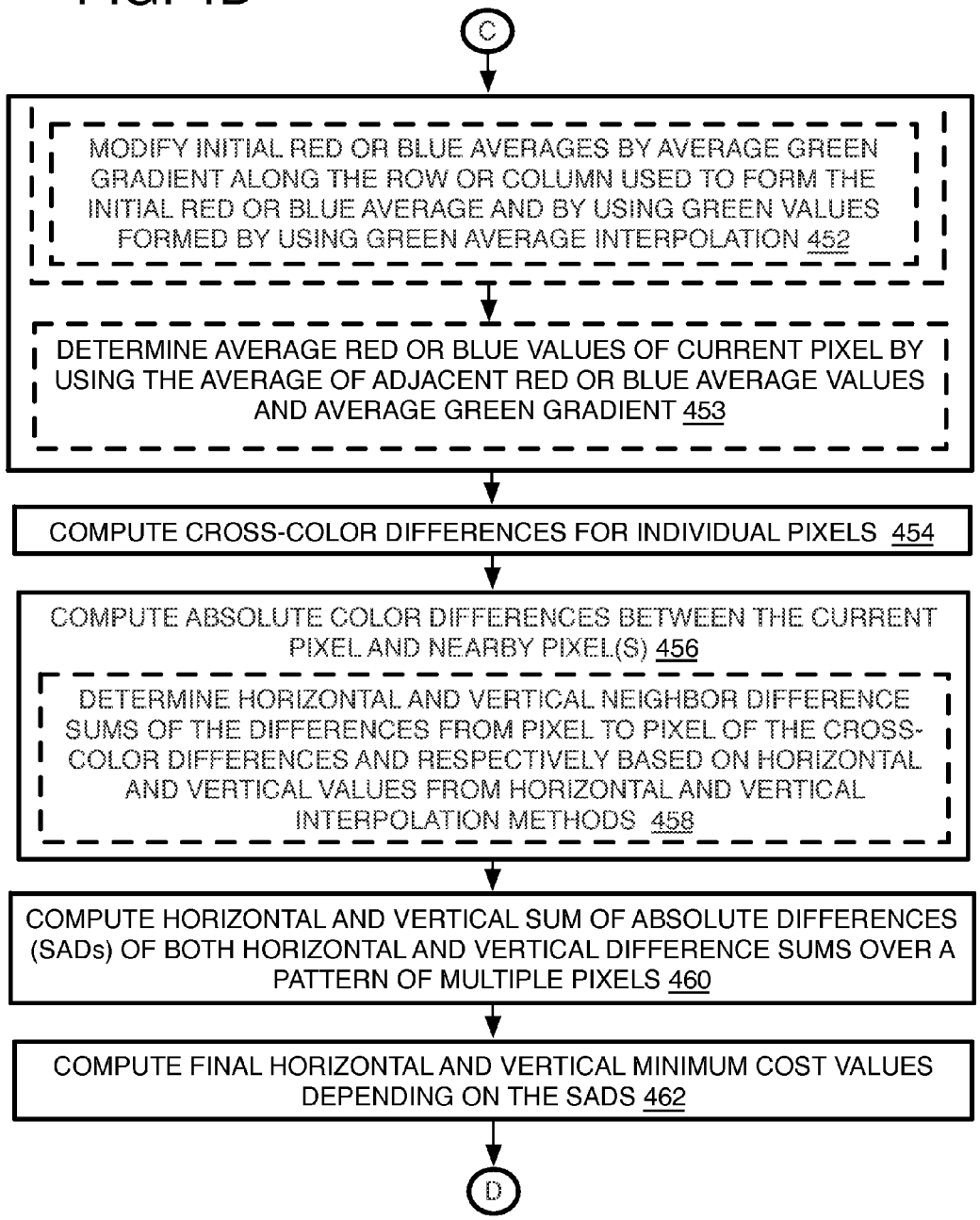
Figure 4F:
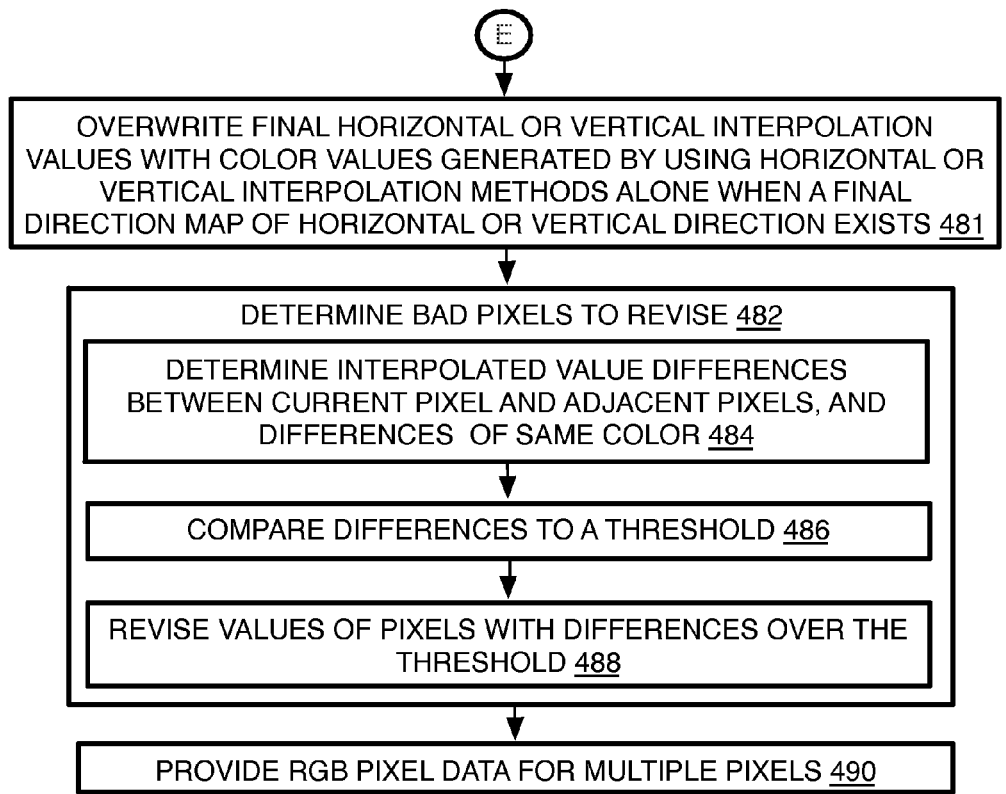

Referring now to FIG. 2, by one approach, an example process 200 is a computer-implemented method of demosaicing Bayer-type image date for image processing. In the illustrated implementation, process 200 may include one or more operations, functions or actions as illustrated by one or more of operations 202 to 212 numbered evenly. By way of non-limiting example, process 200 may be described herein with reference to example image capture device 800 of FIG. 8, and where relevant.

Process 200 may include "receive pixel image data with pixels missing color values" 202, or by one example, raw Bayer filter image data, which may be in a RG-GB pattern or other patterns as described herein. Missing color values refers to color values that are needed in order to provide an image with certain processing arranged to provide an image for a certain multi-color space, such as the RGB color space by one example.

Process 200 may include "form a first edge determination of individual pixels by using pixels missing color values" 204. Particularly, an edge direction, or likelihood of the edge direction, in the form of a direction map, may be determined for individual pixel locations by calculating color gradients at or near a current pixel being analyzed, and while in the Bayer domain. The gradients may be compared to each other and/or a scale threshold to determine initial direction maps, while a comparison of multiple direction maps at or near the pixel being analyzed may be used to determine the strength of the likelihood of the edge direction being present. Those with a sufficiently uniform area around the pixel being analyzed with a strong indication of a horizontal or vertical edge may have a final direction map labeled as such (horizontal or vertical edge) indicating a corresponding interpolation method for that direction is to be applied as explained below. A separate determination as to whether the average interpolation method should apply to a pixel also may be made.

Process 200 may include "generate initial color values to provide the missing color values and from alternative interpolation methods" 206. Thus, the algorithms for average, horizontal, and vertical interpolation are applied to multiple pixels, and in one example, all pixels, so that each pixel has an initial R, G, and B value thereby forming the interpolation domain. By one perspective, as mentioned above, this effectively creates at least two different images: one image of horizontal values and another image of vertical values. Also, these initial values are computed for the pixels that already were assigned an interpolation method in the Bayer domain as well so that those pixel can be used as neighbor pixels to calculate interpolation values for other pixels. The details are provided below Now in the interpolation domain, process 200 may include "form at least a second edge determination of the individual pixels using at least the initial color values" 208. Particularly, this may include using the initial R, G, and B values to form cross-color differences for individual pixels and that are ultimately used to form a cost value for the horizontal and vertical directions (and interpolation methods). The selection between the horizontal and vertical interpolation method then may depend on which is the minimum cost of the two costs as well as other factors described below. This selection between minimum costs may be considered the second edge determination since selection of the minimum horizontal cost indicates a horizontal edge is more dominant while selection of the minimum vertical cost indicates a vertical edge is more dominant.

Process 200 may include "select a method of interpolation to use to calculate final color values of the individual pixels and depending on the first and second edge determinations" 210. Thus, by one example, the interpolation domain may be used to determine whether the horizontal or vertical interpolation should be used in light of the second edge determination. As mentioned, however, the Bayer domain may be used to form predetermined selections of average interpolation method or horizontal and vertical interpolation methods based on the setting of horizontal or vertical final direction maps as the first edge determinations. Thus, the predetermined interpolation methods from the Bayer domain may override the determination from the interpolation domain. By one form, those pixels with a definite horizontal edge or vertical edge final direction map override this interpolation domain decision and will have its interpolated values computed by the horizontal or vertical interpolation methods as dictated by the final direction map. Other details are provided below.

Process 200 may include "interpolate the missing color values so that individual pixels have multiple color values each of a different color" 212. Thus, by one example, the analysis is complete when individual, or each, pixel has all three color values for RGB color space. Other color space examples are possible as well.

Referring to FIG. 3, an example process 300 is another computer-implemented method of demosaicing Bayer-type image date for image processing. In the illustrated implementation, process 300 may include one or more operations, functions or actions as illustrated by one or more of operations 302 to 320 numbered evenly. By way of non-limiting example, process 300 may be described herein with reference to example image capture device 800 of FIG. 8, and where relevant.

Process 300 includes "receive image data comprising raw Bayer content" 302. As mentioned above and as shown in FIG. 1, this may include receiving raw image data in the form of Bayer filter pattern 100 or other Bayer-type image data where each pixel has a color intensity or hue value (or chroma value) for one color and is missing values for the other two colors. This is the Bayer Domain. The data pattern (or data) 100 has a letter (R, G, or B) at each pixel location that indicates the pixel location has a color value for a color (red, green, or blue) and missing color values for the other two colors. The subscript for each letter indicates its (y, x) or (row, column) position in the pattern starting from the upper left corner of the pattern. The implementations described herein and referring to FIG. 1 provide examples to find the missing color ($G_{33}$ and $B_{33}$) values for the center position of the pattern that has a red color ($R_{33}$) value at position (3 3) of a 5×5 grid portion of an image. Each color value in RGB color space is a decimal value from 0 to 255 for 8-bit binary values, or from 0 to 1024 for 16 bit binary values.

Process 300 includes "perform a pre-directional check in Bayer image" 304. Thus, a pre-determination of horizontal or vertical edge direction is performed, which is basically and operation to characterize the RAW Bayer content. This operation is aimed at identifying strong vertical and horizontal correlations in image content and accordingly definitively establishes final interpolation decisions for pixels with strong horizontal or vertical edge directions. Thus, computed final direction map decisions override any other SAD/cost based interpolation domain decisions on the final interpolation direction to be used for the pixel. For all pixels which do not have a final direction map defined (no direction) in the Bayer domain, the interpolation domain decision making is used and as explained below.

Process 300 includes "perform good pixel check" 306. Also still in the Bayer domain, the good pixel check is performed to determine whether two missing colors in a pixel can be interpolated by the average interpolation method, and in one form, all pixel locations are tested, even the pixels with horizontal or vertical final direction maps. The differences in pixel color values from a current pixel to nearby pixels are compared to thresholds as described below. This tests whether the color of the area of the pixel being tested has a certain minimum flatness or uniformity in color without strong edges. The assigning of the average interpolation method to a pixel will also override the horizontal or vertical interpolation method in the interpolation domain.

Process 300 includes "perform green color interpolation" 308. For green color interpolation, horizontal, vertical, and average interpolation values are calculated. For horizontal and vertical values, equations with average and second order gradients are used. Average values use the current average color value and target color average values from neighbors. Both are explained in greater detail below.

Process 300 includes "perform red and blue color interpolation" 310. The equations to perform average, horizontal and vertical interpolation for red and blue also use an average of the values of nearby pixels in the same modified by a gradient in green. The gradient in a different color is used based on the assumption that change in hue from pixel-to-pixel will be similar from color component to color component. The details are provided below.

Process 300 includes "compute horizontal and vertical pixel differences and SADs" 312, and also as described below, cross-color differences are determined for multiple, or each, pixel (such as the difference between red and green, green and blue, and blue and red). The absolute difference of the cross-color differences from pixel-to-pixel including between a current pixel and at least two nearby pixels is determined and summed with the difference for each color component. These sums as a portion of a pattern of multiple pixels are then formed into SADs. Each SAD of a portion of the pattern is then compared to determine a minimum cost for horizontal interpolation and vertical interpolation.

Process 300 includes "select interpolation method among vertical and horizontal" 314. Between horizontal and vertical interpolation, a decision is made depending on which direction (horizontal or vertical) has the minimum cost as well as the position of the current pixel in a row (or column) of pixels on the image, and the interpolation method used at an adjacent pixel along the row (or column) in the image. The horizontal or vertical interpolation method then may be selected and used to form an initial interpolation method. The final interpolation method then may be a median value of three adjacent color values along a row or column of the initial interpolation method.

Process 300 then may include "override horizontal or vertical interpolation method value with average method or method indicated by final direction map" 316. Thus, the final interpolation method from the interpolation domain then may be overwritten when an average interpolation method applies or when a final direction map indicates the horizontal or vertical interpolation method is to be used from the Bayer domain.

Process 300 includes "perform bad pixel detection" 318. This is a post-processing operation that modifies any outliers as described in greater detail below.

Process 300 includes "provide RGB color data of pixels" 320, and as mentioned above for encoding, further pre-processing before encoding, display, or storage to name a few examples.

Referring to FIGS. 4A-4F, an example process 400 provides a detailed computer-implemented method of demosaicing Bayer (or Bayer-type) image date for image processing. In the illustrated implementation, process 400 may include one or more operations, functions or actions as illustrated by one or more of operations 402 to 490 numbered evenly. By way of non-limiting example, process 400 may be described herein with reference to example image processing system 800 of FIG. 8, and where relevant.

Process 400 may include "receive image data comprising raw Bayer content" 402, and as already explained above with operation 302. The image content is Bayer-type content with pixels with missing color values, and in one example as with pattern 100 (FIG. 1).

Process 400 may include "perform pre-determination of edge confidence by forming direction maps" 404. As explained above, this may be a pre-determination operation to determine whether a pixel has a strong or large gradient in a horizontal or vertical direction in the form of a direction map which likely indicates the direction of an edge of an object in the content of the image and at the pixel location being analyzed. The interpolation to obtain the missing colors may be computed more accurately when the direction of the edge at a pixel is known by selecting an interpolation method (or combined result from a number of methods) depending on the gradient direction. As mentioned above, the horizontal interpolation method may be used to calculate horizontal color values when a horizontal direction (or horizontal edge) exists. In this case, the vertical gradients in color value are greater than the horizontal gradients. The opposite is true for the vertical interpolation method that provides vertical color values when a vertical direction (or vertical edge) exists, and the horizontal gradients are greater than the vertical gradients.

To form an original direction map then, the pre-determination operation 404 may include "compute horizontal and vertical correlation values" 406 as one of the initial operations. A direction map is computed in Bayer space by computing a horizontal direction, vertical direction, or no direction correlation value in the available channels around individual pixels and in 8-bit values (although it could be 16 bits or other sizes). To compute the correlations, a precision shift is first determined to limit the size of the numbers used in the calculations thereby reducing the computational load, and in this example to maintain 8-bit correlation values.

$$\text{shift} = m\_\text{SourceBayerprecision} - 8 \tag{1}$$

By using shifted color values for correlation calculation, hardware cost and computation complexity may be reduced.

Thus, to compute the correlation values, and in this example for a red ($R_{33}$) center pixel location, $$GH = abs(G_{32} \gg \text{shift} - G_{34} \gg \text{shift}) \tag{2}$$

$$GV = abs(G_{23} \gg \text{shift} - G_{43} \gg \text{shift}) \tag{3}$$

$$BH = abs(B_{22} \gg \text{shift} - B_{24} \gg \text{Shift}) + abs(B_{42} \gg \text{shift} - B_{44} \gg \text{shift}) \tag{4}$$

$$BV = abs(B_{22} \gg \text{shift} - B_{42} \gg \text{shift}) + abs(B_{24} \gg \text{shift} - B_{44} \gg \text{shift}) \tag{5}$$

where green horizontal (GH) correlation and green vertical (GV) correlation is calculated by obtaining the absolute difference in green value respectively in the horizontal and vertical directions, and between the pixel locations adjacent the center red pixel $R_{33}$ being analyzed for example in a cross-pattern. To state it another way, GH is the difference between the green values in the same row and at the left and right pixel locations relative to the center red pixel being analyzed, while the GV value is the difference between the green values at the pixel locations in the same column and above and below the center red pixel being analyzed.

The blue correlations are determined from the blue color values at the four corners of a square of pixel locations, as indicated by equations (4) and (5) above (and as shown on FIG. 1), and around the center red pixel being analyzed. Thus, blue horizontal (BH) correlation is based on the horizontal absolute differences between each pair of blue values on the same row of pixels above and below the center pixel location $R_{33}$. Likewise, the blue vertical (BV) correlation is the absolute differences between the blue values on the same columns to the left and right of the center pixel location. Essentially, for both green and blue correlations, the pixels closest to the center pixel (or the pixel for which a direction decision is being made, in this case R33) are chosen to ensure most accurate gradient information per channel. It also should be noted that the shift is applied in equations (2) to (5) as a bitshift (or division operation) to limit the computational load as mentioned.

Equations similar to the equations (1) to (5) are used when the blue value is known and is at the center pixel except the red correlation is computed instead of blue correlation. In this case, the green equations (2) and (3) are only revised to include green value pixels in the same relative position to a center pixel, and the pixel relationships in the blue equations (4) and (5) are used to determine red correlations instead. On the other hand, when a green value is at the center pixel, only the adjacent four corner green values are used in a square of pixels around the center pixel, and the green color values are used in equations similar to the blue corner equations (equations (4) and (5)) above to determine the correlations for direction maps. Thus, for example, if pixel $G_{23}$ is the center pixel location (FIG. 1), only the green color values at $G_{12}$, $G_{14}$, $G_{32}$, and $G_{34}$ would be used, and in equations similar to equations (4) and (5) to determine the green correlations such that the absolute differences in rows and the absolute differences in columns among the four green pixel values would be computed for the correlation.

The pre-determination operation also may include "use correlation values to determine original direction maps" 408. The original direction maps indicate the strength or confidence of an edge at the pixel. The strength or confidence of the horizontal or vertical directions may be controlled by a programmable state parameter that is effectively a threshold called "Direction Map Scale". The direction map scale (m_dms or m_DirMapScale) may be set by experimentation and the default values are selected as the one with the least visual artifacts. The m_DirMapScale may be one fixed value for all images in a clip or fixed to a unique value for every image. In general, the direction map scale defines the strength of horizontal or vertical gradients intended to be identified. High values of the direction map scale ensure that only strong horizontal and vertical edges are identified. Lower values of the parameter on the other hand can identify less strong edges and also possibly may result in visual artifacts.

The Direction Map Scale then may be used as follows to determine the original direction maps.

If ($m$_DirMapScale*$GH$<$GV$ and
$m$_DirMapScale*$BH$<$BV$), then DirMapOrg[$y$][$x$]=HORIZONTAL DIRECTION, else if ($m$_DirMapScale*$GV$<$GH$ and
$m$_DirMapScale*$BV$<$BH$), then DirMapOrg[$y$][$x$]=VERTICAL DIRECTION, else DirMapOrg[$y$][$x$]=NO DIRECTION  (6)

This equation may result in an original direction map for each pixel location. When the vertical gradients or correlations (GV and BV) are larger than the horizontal gradients multiplied by the scale factor, the edge is more likely to run horizontally, and the opposite is true for when the horizontal gradients (GH and BH) are larger than the scale factored vertical values, which means the edge is more likely to run vertically. When the values cannot overcome the m_DirMapScale factor, the pixel's direction map is labeled no direction even though the horizontal gradient values may be both larger than the vertical gradient values, or vice-versa, in a direct comparison. In this case, it is still considered too close to call (horizontal or vertical direction map).

The pre-determination operation also may include "reassign original direction maps of no direction depending on direction maps of surrounding pixels" 410. By one form, a nine point median of a 3×3 window of direction maps is determined on all pixels for which "no direction" was identified. This operation is performed to better ensure uniformity in detection of an edge. If both horizontal and vertical direction maps exist in a current nine input pixels for a median, DirMap will remain no direction as follows.

if (DirMapOrg[$y$][$x$]=NO DIRECTION),

DirMapInter[$y$][$x$]=9 pt Median(DirMapOrg[$y$−1][$x$−1]:DirMapOrg[$y$+1][$x$+1])  (7)

Hence, the new (or revised) direction map can be stated as:

DirMapNew=DirMapOrg|DirMapInter  (8)

When there are only two different direction maps in 3×3 window such as only horizontal and no directions, or vertical and no directions, the median operation sets the majority direction as the direction for the direction map of the center pixel since the majority will have the median position in the sample set (the 9 pts of the 3 s 3 window). Thus, for example, if five or more of the 9 points in the 3×3 window have a direction map of no direction, then no direction is set as the median, and the direction map for the center point being analyzed remains as no direction (or in other words, DirMapInter[y][x] and DirMapNew=no direction). Likewise, the median, and therefore the direction map for the center pixel, is set at horizontal or vertical when a majority of horizontal or vertical direction maps of the 9 pts of the 3×3 window exists. In that case, the direction map (DirMap-New) is switched to the majority direction map, either horizontal or vertical. As mentioned, however, this is true only when two types of direction maps are present, not when all three types of direction maps are present, which results in the center pixel remaining no direction.

Then, the pre-determination operation may include "determine final direction maps" 412, and is applied to pixels with original or new direction maps labeled horizontal or vertical so far. Those pixels that have direction maps labeled no direction are not tested since these pixels cannot pass the final direction map test by definition. Specifically, this operation may include "determine if direction maps in local pixel area near current pixel are all horizontal or all vertical" 414. Then, the process 400 may include "respectively label final direction map horizontal or vertical when local pixel area is uniformly horizontal or vertical" 416. This may be performed to better ensure accurate detection and high confidence in the detection. Thus, this operation checks for a localized region (such as local region 415 on FIG. 1) to have strong one-directional correlation before setting the final direction of the final direction map for the pixel being analyzed, and is more specific than the median test by testing for a uniformly (or contiguously) horizontal or vertical direction map area. The final direction map may be set as follows.

if (DirMapNew[$y$−1][$x$], DirMapNew[$y$][$x$−1],
DirMapNew[$y$][$x$+1],

DirMapNew[$y$+1][$x$] & DirMapNew[$y$][$x$] are HORIZONTAL)

FinalDirMap[$y$][$x$]=HORIZONTAL=>uses HORIZONTAL values  (9)

if (DirMapNew[$y$−1][$x$], DirMapNew[$y$][$x$−1],
DirMapNew[$y$][$x$+1],

DirMapNew[$y$+1][$x$] & DirMapNew[$y$][$x$] are VERTICAL)

FinalDirMap[$y$][$x$]=VERTICAL=>uses VERTICAL values  (10)

where equation (9) is a strong indication of a horizontal edge (where vertical gradients are greater than the horizontal gradients), and equation (10) is a strong indication of a vertical edge (where horizontal gradients are greater than the vertical gradients). By this example, the local area is set in a pre-determined pattern for both equations (9) and (10) as a five-point area or plus-shaped pattern comprising the center pixel (position at $R_{33}$ for the pattern 415 of the example of FIG. 1) and immediate horizontal and vertical neighbors (positions at $G_{23}$, $G_{32}$, $G_{34}$, and $G_{43}$ for the pattern 415 of the example of FIG. 1) of the center pixel. This creates a contiguous area that extends on all four sides of the center pixel. Other contiguous patterns could be used as well. When the final direction map is horizontal, the horizontal interpolation method is used as described below, and when the final direction map is vertical, the vertical interpolation method is used, also as described below, and overrides whichever interpolation method is selected for use for that center pixel in the interpolation domain also as explained below.

When the direction maps of the local area is not uniform, these pixels may be labeled with "no direction" as well, and include those direction maps that were labeled horizontal or vertical, either originally or after the median operation, but were not sufficiently uniform or contiguous on all sides of the center pixel to have a final direction map of horizontal or vertical. In these cases, the missing color values for these pixels will be determined by interpolation domain decision based on minimum cost and/or SAD based decisions as explained below, unless the pixels pass the good pixel test for application of the average interpolation method.

Specifically, the process 400 may include "perform check for good pixels to determine whether method of average interpolation should be used for a pixel" 418. As mentioned above, this tests the uniformity of color (and in turn lack of edges) in the area of the pixel being tested, and if sufficiently uniform, may have its colors interpolated by the average interpolation method. The test is performed in the Bayer domain where the pixels are still missing color values, and by one form, the test is applied to any pixel with a direction map of no direction, but may alternatively be applied to all pixels. The pixels with a final direction map of horizontal or vertical should not pass the good pixel test due to the amount of color value gradients present at or near pixels with a final direction map.

The good pixel operation then may include "determine differences between color value of current pixel and closest pixels of the same color" 420. By one example for this test, there are nine pixels used in good pixel detection: one current pixel and eight neighbor pixels all of the same color. Eight differences are calculated between one of the nine pixels (and specifically the center pixel) and its eight closest same color neighbor pixels. For a red and blue pixel, the closest neighbor pixels with the same color form a square around the center pixel being analyzed, while the closest neighbor pixels for a green center pixel forms a diamond (as can be seen in FIG. 1).

There are two counters including a first counter that counts the number of times the difference is smaller than a first predetermined threshold such that the process 400 may include "count the number of differences less than a maximum threshold" 422. The second counter is increased when the difference is larger than another threshold so that the process 400 may include "count the number of differences greater than a minimum threshold" 424. Then, the process 400 may include "use average interpolation when either count is above a third threshold" 426. If one of the counters is larger than the third threshold, the pixel uses average interpolation values determined by the calculations set below. Thus, the first and second threshold sets an acceptable range of color change, and the third threshold sets the strength of maintaining values within the range. The thresholds may be set by experimentation and the default values are set as those that cause the least artifacts.

Now turning to the formation of the interpolation domain where the missing color values for a pixel are actually calculated, the process 400 may include "perform green interpolations to determine green color value for a current pixel by using horizontal or vertical interpolation methods" 428. This is performed for each of the pixels that are missing a green color value. For horizontal and vertical interpolation methods, a green average and second order gradient is used. Thus, the vertical and horizontal interpolation methods include "determine a green value by finding an initial green average" 430, and then "modify the initial green average by a gradient of the color of the current pixel along the column or row of the current pixel" 432. To compute this, the equation for the green vertical value based on the initial green average and second order gradient for a vertical interpolation value is:

$$G_{33}^v = (G_{23}+G_{43})/2 + (-R_{13}+2*R_{33}-R_{53})/2 \qquad (11)$$

where the superscript indicates the interpolation method and the subscript indicates the pixel position, and where $(G_{23}+G_{43})/2$ is the initial average of the color values of the same color as the color value being interpolated and in the closest pixels with the same color in the same column as the center or current pixel being analyzed ($R_{33}$). $(-R_{13}+2*R_{33}-R_{53})/2$ is the second order gradient that provides the gradient of the color of the center pixel and with the two closest pixels along the same column of the center pixel. Likewise, the horizontal interpolation method includes determining a green horizontal value by finding an initial green average modified by a gradient of the color of the current pixel along the row of the current pixel, and the green horizontal value is calculated by:

$$G_{33}^h = (G_{32}+G_{34})/2 + (-R_{31}+2*R_{33}-R_{35})/2 \qquad (12)$$

which is similar to the vertical interpolation except that the average and second order gradient (or average gradient) are calculated along the row of the current or center pixel being analyzed instead of the column. This works based on the assumption that the change or gradient of one color will be similar to the change or gradient in the other colors.

Figure 5:
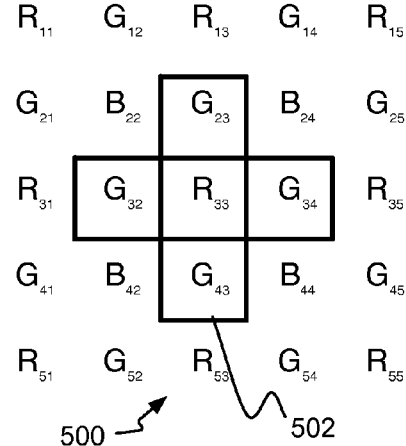
FIG. 5 is a schematic diagram of a Bayer mosaic pixel grid showing a demosaic interpolation pattern.

The process 400 may include "perform green interpolation by using an average interpolation method" 434. As mentioned above, this interpolation method may be used for those pixels that pass the good pixel test and are found to be in relatively uniform or flat color area without edges. By one form, the calculation may be performed for all pixels that are missing a green color value. For the average interpolation method, the equation uses the current average color value and target color average values from neighbors. Specifically, the average interpolation method may include "determine an initial average green value in pixels near current pixel including providing extra weight for immediately adjacent cross pattern" 436. Thus, for example, and as shown in FIG. 5, an intermediate or initial average green value (Average (G)) is determined of all of the green values of the pixel locations within a 5×5 grid of pixels with the current pixel ($R_{33}$) in the center. The closest four green pixels in the cross formation ($G_{23}$, $G_{32}$, $G_{34}$, $G_{43}$) are doubled to provide those adjacent locations with more weight. Experimentation has found that a grid of this size (5×5) provides a good tradeoff between quality and complexity (computational load). The example equation is therefore:

$$\text{Average}(G) = \tag{13}$$

$$(G_{12} + G_{14} + G_{21} + G_{23} \times 2 + G_{25} + G_{32} \times 2 + G_{34} \times 2 + G_{41} +$$

$$G_{43} \times 2 + G_{45} + G_{52} + G_{54})/16$$

The process 400 may include "determine average red value including current pixel" 438, and more generally, the average of the color values of the same color as the existing color value of the current pixel. This average is of the pixel locations in the 5×5 grid with the same color except that the center or current value replaces one of the other values (here $R_{11}$) to obtain eight values as follows.

$$\text{Average}(R) = (R_{13} + R_{15} + R_{31} + R_{33} + R_{35} + R_{51} + R_{53} + R_{55})/8 \tag{14}$$

The selection of 16 and 8 values used for the averages above are selected for ease of computation. In a 5×5 Bayer area, there are 12 green pixels, 9 (4) red pixels and 4 (9) blue pixels. To use a power of 2 for denominator for HW simplicity, we make 12 to 16 by multiplying 2 for the center 4 pixels. Also, for HW simplicity, we remove one red pixel and make 9 to 8.

Then, to obtain the final green value from the average interpolation method, the process may include "determine final green average by modifying the initial average green value by the difference in color value of the current pixel and the average color value of the same color as the current pixel in the area near the current pixel" 440. In this case, the color value of the current pixel is red. The equation is:

$$G_{33}^A = R_{33} + \text{Average}(G) - \text{Average}(R) \tag{15}$$

where superscript indicates the interpolation method and the subscript indicates the pixel location.

Process 400 may include "perform red and blue horizontal and vertical interpolations" 442. This operation may include "determine red or blue value of pixel locations adjacent and including the current pixel" 444. This in turn, may include "determine initial red or blue average along row or column respectively for horizontal or vertical vdirection" 445. Then, "modify initial averages by average green horizontal or vertical gradient values" 446. Thus, the red or blue value is respectively formed from initial average (or interpolation) red or blue value plus the average difference or gradient in green. Both of these averages are taken along the same row, for horizontal value, or same column, for vertical value, as the pixel location being analyzed. By one form, the blue or red horizontal and vertical values are determined for each of the locations in the adjacent cross-pattern (or plus-shaped pattern) 502 of example grid 500 (FIG. 5) including the (2, 3), (3, 2), (4, 3), (3, 4), and current, center (3, 3) positions. The equations (16) to (25) for blue color interpolation values for horizontal and vertical direction at the (2, 3), (3, 2), (4, 3), (3, 4), and (3, 3) pixel positions are shown below, while red color calculation uses similar equations except that red values are used instead of blue values.

$$B_{23}^H = \frac{B_{22} + B_{24}}{2} + \frac{-G_{22}^H + 2G_{23} - G_{24}^H}{2} \tag{16}$$

$$B_{32}^V = \frac{B_{22} + B_{42}}{2} + \frac{-G_{22}^V + 2G_{32} - G_{42}^V}{2} \tag{17}$$

$$B_{43}^H = \frac{B_{42} + B_{44}}{2} + \frac{-G_{42}^H + 2G_{43} - G_{44}^H}{2} \tag{18}$$

$$B_{34}^V = \frac{B_{24} + B_{44}}{2} + \frac{-G_{24}^V + 2G_{34} - G_{44}^V}{2} \tag{19}$$

$$B_{33}^V = \frac{B_{23}^V + B_{43}^V}{2} + \frac{-G_{23} + 2G_{33}^V - G_{43}}{2} \tag{20}$$

$$B_{23}^V = \frac{B_{22} + B_{24}}{2} + \frac{-G_{22}^V + 2G_{23} - G_{24}^V}{2} \tag{21}$$

$$B_{32}^H = \frac{B_{22} + B_{42}}{2} + \frac{-G_{22}^H + 2G_{32} - G_{42}^H}{2} \tag{22}$$

$$B_{43}^V = \frac{B_{42} + B_{44}}{2} + \frac{-G_{42}^V + 2G_{43} - G_{44}^V}{2} \tag{23}$$

$$B_{34}^H = \frac{B_{24} + B_{44}}{2} + \frac{-G_{24}^H + 2G_{34} - G_{44}^H}{2} \tag{24}$$

$$B_{33}^H = \frac{B_{32}^H + B_{34}^H}{2} + \frac{-G_{32} + 2G_{33}^H - G_{34}}{2} \tag{25}$$

For the average interpolation method, the process 400 may include "perform average interpolation to obtain red and blue average interpolation values" 448. This operation may include "determine red or blue value of pixel locations adjacent the current location" 450. By one example, this includes determining the red or blue values above and below, and to the left and right, of the current pixel in the cross-pattern 502 on grid 500 (FIG. 5). In this case, for the average interpolation method, the red or blue value of the center, current pixel is not formed yet, and will be formed from these other four values of the cross-pattern or other desired shape. Thus, first, this operation includes "determine initial red or blue average of adjacent pixel and along row or column depending on position of adjacent pixel" 451. Specifically, as shown in equations (26) to (29) below, the values of the four adjacent pixel locations (2, 3), (3, 2), (4, 3), (3, 4) are determined by finding in initial average from corner pixel locations of the 3×3 area centered around the current pixel (3, 3). Thus, the initial averages of the pixel locations to the left and right of the current pixel (3, 2) and (3, 4) respectively use the color values of the pixels above and below those left and right positions. Likewise, the initial averages of the pixel locations above and below the current pixel are found by using the values respectively at the pixels left and right of those pixels above and below the current pixel location (see equations (26) to (29) below).

The blue or red average interpolation operation then may include "modify initial averages by average green gradient along the row or column used to form the initial red or blue average and by using average green values formed by using green average interpolation" 452, also as shown in equations (26) to (29). As shown, the green average values from the average interpolation method are used to find the green gradients. The row or column is the same as that used to determine the initial average for the blue or red value. The blue color average interpolation values for pixel locations (2, 3), (3, 2), (4, 3), (3, 4) are shown below, while again, the equations for red are similar in relative relation between pixel locations.

$$B_{23}^A = \frac{B_{22} + B_{24}}{2} + \frac{-G_{22}^A + 2G_{23} - G_{24}^A}{2} \tag{26}$$

$$B_{43}^A = \frac{B_{42} + B_{44}}{2} + \frac{-G_{42}^A + 2G_{43} - G_{44}^A}{2} \tag{27}$$

-continued $$B_{32}^A = \frac{B_{22} + B_{42}}{2} + \frac{-G_{22}^A + 2G_{32}^A - G_{42}^A}{2} \quad (28)$$

$$B_{34}^A = \frac{B_{24} + B_{44}}{2} + \frac{-G_{24}^A + 2G_{34}^A - G_{44}^A}{2} \quad (29)$$

$$B_{33}^A = \frac{B_{23}^A + B_{43}^A + B_{32}^A + B_{34}^A}{4} + \quad (30)$$
$$\frac{(-G_{23} + 2G_{33}^A - G_{43}) + (-G_{32} + 2G_{33}^A - G_{34})}{4}$$

Referring to equation (30) above, then the process 400 may include "determine average red or blue values of current pixel by using the average of adjacent red or blue average values and average green gradient" 453. Particularly, an average of the four adjacent blue or red values is determined and modified by the green gradient average of the differences between each adjacent green value and the average green value at the center or current pixel. In other words, the average initial average is modified by the average green difference in the cross-pattern. Again, the red color calculation uses similar equations with the same relative relationship between pixel locations.

The result of the average, horizontal, and vertical interpolations is now each pixel has RGB values so that the further computations are considered to be in the interpolation domain. Thus, by one example, each pixel location has its original color value R, G, or B as well as the horizontal $C^h$, vertical $C^v$, and average $C^A$ interpolation value for each of the other two missing colors (where C just refers to color value and could be any of R, G, or B or any other color being used). Another way to say this is that a horizontal and vertical image has been created respectively formed of horizontal or vertical interpolation values, while the average values are determined to form values for pixels finally selected for average interpolation method.

Now in the interpolation domain, the process 400 may include "compute cross-color differences for individual pixels" 454, and in one form, for each pixel in the image. Thus, after the G/B/R interpolation operations, horizontal and vertical cross-color pixel differences are calculated, and more precisely, color component differences are computed for individual pixels, and separately for both the horizontal values obtained from the horizontal interpolation method and vertical values obtained from the vertical interpolation method. For example, the cross-color differences in horizontal color values between red and green, green and blue, and blue and red for the same single pixel are determined, and the same is applied to the vertical color values. The cross-color differences may be calculated by the equations (31) to (36) as follows:

$$DRG^H(x,y) = R^{H8}(x,y) - G^{H8}(x,y) \quad (31)$$

$$DGB^H(x,y) = G^{H8}(x,y) - B^{H8}(x,y) \quad (32)$$

$$DBR^H(x,y) = B^{H8}(x,y) - R^{H8}(x,y) \quad (33)$$

$$DRG^V(x,y) = R^{V8}(x,y) - G^{V8}(x,y) \quad (34)$$

$$DGB^V(x,y) = G^{V8}(x,y) - B^{V8}(x,y) \quad (35)$$

$$DBR^V(x,y) = B^{V8}(x,y) - R^{V8}(x,y) \quad (36)$$

where DRG, DGB, and DBR simply stand for difference in red and green values, green and blue values, or blue and red values. The H8 or V8 superscript, in addition to indicating the interpolation method, also refers to the use of the first 8 bit to reduce HW complexity only.

The cross-color differences between R and G, between G and B, and between B and R provide at least a representation or relationship among the color components for a single pixel. This representation can then be compared to other pixels to determine whether the current pixel is in a relatively consistent area of the image. Since the basis of the cross-color differences are horizontal or vertical interpolation method values, a more consistent area now may suggest a stronger edge (or it is more likely that an edge is present). The following operation finds the absolute differences in cross-color difference between pixels.

The process 400 may include "compute absolute color differences between the current pixel and nearby pixel(s)" 456. By one form, the nearby pixels are adjacent pixels. This may include one pixel to the left or right of the current pixel to obtain a horizontal pixel-to-pixel difference, and one pixel above or below the current pixel to obtain a vertical pixel-to-pixel difference. By the example below, the adjacent pixels include one to the left (x−1, y) of the current pixel (x, y), and one below (x, 1−y) the current pixel. Other alternatives are contemplated. To accomplish this operation, the process may include "determine horizontal and vertical neighbor difference sums of the differences from pixel to pixel of the cross-color differences and respectively based on horizontal and vertical values from horizontal and vertical interpolation methods" 458. Specifically, each comparison between the current pixel and a nearby pixel may include two differences: one difference using the horizontal values from the horizontal interpolation method, and the other using the vertical values from the vertical interpolation method. Each comparison finds the difference between the cross-color difference on the current pixel and the cross-color difference on the nearby pixel. This is performed for each color, here R, G, and B, and the differences for all three colors are added together to form the horizontal or vertical difference sum. This is shown by example equations (37) to (40) as follows.

$$HDSUM^H(x, y) = (|DRG^H(x, y) - DRG^H(x-1, y)| + \quad (37)$$
$$|DGB^H(x, y) - DGB^H(x-1, y)| +$$
$$|DBR^H(x, y) - DBR^H(x-1, y)|)$$

$$VDSUM^H(x, y) = (|DRG^H(x, y) - DRG^H(x, y-1)| + \quad (38)$$
$$|DGB^H(x, y) - DGB^H(x, y-1)| +$$
$$|DBR^H(x, y) - DBR^H(x, y-1)|)$$

$$HDSUM^V(v, y) = (|DRG^V(x, y) - DRG^V(x-1, y)| + \quad (39)$$
$$|DGB^V(x, y) - DGB^V(x-1, y)| +$$
$$|DBR^V(x, y) - DBR^V(x-1, y)|)$$

$$VDSUM^V(x, y) = (|DRG^V(x, y) - DRG^V(x, y-1)| + \quad (40)$$
$$|DGB^V(x, y) - DGB^V(x, y-1)| +$$
$$|DBR^V(x, y) - DBR^V(x, y-1)|)$$

where (x, y) is the current pixel, and where the H or V in HDSUM or VDSUM indicates the relative position of the nearby pixel to the current pixel (D stands for difference), while the superscript still indicates which interpolation method (horizontal or vertical) provided the color values.

Figure 6:
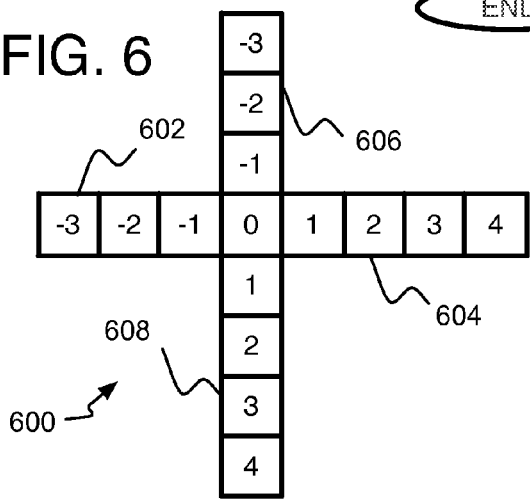
FIG. 6 is a schematic diagram of another pattern for demosaicing Bayer image data.

Referring to FIG. 6, the process 400 may include "compute horizontal and vertical sum of absolute differences (SADs) of both horizontal and vertical difference sums over a pattern of multiple pixels" 460. By one example, a pattern 600 is a cross-pattern, and by this example an 8×8 cross pattern for 15 pixel locations as shown, and a SAD is formed for each part (or arm) of the cross-pattern, and each parts has two SADs, one for the horizontal values (horizontal interpolation method) and one for the vertical values (the vertical interpolation method). The pixel location at the center of the cross is labeled 0 on pattern 600 and has the coordinates (x, y). The distance from the center pixel location to the other pixel locations in the cross are labeled (i, j) on pattern 600 and equations (41) to (48) recited below to obtain the eight SADs to be computed. The four parts of the cross-pattern include a left part 602 labeled (as i) from −3 to 0 to include the SAD at the center pixel location and to compute HLSAD or VLSAD. The right part 604 of the pattern 600 is labeled (as i) from 1 to 4 to compute HRSAD or VRSAD. Similarly, an upper part 606 of the pattern is labeled (as j) from −3 to 0 to include the center pixel to compute HUSAD or VUSAD, while a lower or down part of the pattern includes (as j) from 1 to 4 to compute HDSAD or VDSAD, and where (x, y) originates in an upper-left corner so that x increases to the right and y increases downward. Thus, each pixel (x, y) to be analyzed will have eight SAD values, four each for horizontal and vertical interpolation methods, and as determined from the following equations (41) to (48).

$$HLSAD = \sum_{j=-3}^{0} HDSUM^H(x+j, y) \tag{41}$$

$$HRSAD = \sum_{j=1}^{4} HDSUM^H(x+j, y) \tag{42}$$

$$HUSAD = \sum_{i=-3}^{0} VDSUM^H(x, y+j) \tag{43}$$

$$HDSAD = \sum_{i=1}^{4} VDSUM^H(x, y+j) \tag{44}$$

$$VLSAD = \sum_{j=-3}^{0} HDSUM^V(x+j, y) \tag{45}$$

$$VRSAD = \sum_{j=1}^{4} HDSUM^V(x+j, y) \tag{46}$$

$$VUSAD = \sum_{i=-3}^{0} VDSUM^V(x, y+j) \tag{47}$$

$$VDSAD = \sum_{i=1}^{4} VDSUM^V(x, y+j) \tag{48}$$

Once the SAD values are determined, the process 400 may include "compute final horizontal and vertical minimum cost values depending on the SADs" 462. By one example, the SADs from the different parts of the pattern, such as the cross-pattern 600, are compared to determine a set of minimum SADs, one from the horizontal arms 602 or 604 of the cross-pattern 600, and one from the vertical arms 606 or 608 of the cross-pattern. Then, these two minimum SADs are combined to form a minimum cost. This is performed for both the horizontal direction and another minimum cost for the vertical direction so that each pixel has two minimum costs.

More specifically, the horizontal minimum cost (Min_Cost_H) for the horizontal direction (or horizontal interpolation method) is the minimum SAD of the horizontal parts of the cross pattern (HLSAD or HRSAD) plus half (as shown by the bit-shift) the minimum SAD of the vertical parts of the cross pattern (HUSAD or HDSAD). The vertical minimum cost is calculated similarly except that a portion of the minimum horizontal SAD part is added to the whole minimum vertical SAD part. The portion of the minimum horizontal SAD part is determined by dividing the part by a shift value shift_mincost that is determined by experimentation and depends on. The parameters are set by experimentation and default values are selected which have the least artifact. This is performed for each pixel (x, y) so that a minimum horizontal cost and a minimum vertical cost is generated for each pixel. The equations are as follows.

$$\text{Min\_cost\_}H1 = \text{Min}(\text{HLSAD},\text{HRSAD}) \tag{49}$$

$$\text{Min\_cost\_}H2 = \text{Min}(\text{HUSAD},\text{HDSAD}) \tag{50}$$

$$\text{Min\_Cost\_}H = \text{Min\_Cost\_}H1 + (\text{Min\_Cos\_}H2 \gg 1) \tag{51}$$

$$\text{Min\_cost\_}V1 = \text{Min}(\text{VUSAD},\text{VDSAD}) \tag{52}$$

$$\text{Min\_cost\_}V2 = \text{Min}(\text{VLSAD},\text{VRSAD}) \tag{53}$$

$$\text{Min\_Cost\_}V = \text{Min\_Cost\_}V1 + (\text{Min\_Cos\_}V2 \gg \text{shift\_mincost}) \tag{54}$$

These operations provide individual pixels, or each pixel, with a minimum cost for both the horizontal and vertical interpolation methods (or horizontal and vertical directions respectively) where, as explained above, each cost is a combination of the SADs of the pattern, and where each SAD is a sum of the differences from pixel to pixel of the cross-color differences on individual pixels.

Thereafter, the process 400 may include "determine interpolation method to be used" 464, and whether the horizontal or vertical interpolation should be used for a pixel. The process 400 may include "set smaller of minimum horizontal and vertical cost as the default independently for each pixel" 466. Particularly, the minimum cost is separately set for each pixel. The horizontal minimum cost indicates the horizontal interpolation method should be used, and the vertical minimum cost indicates the vertical interpolation method should be used. The interpolation method with the minimum cost is selected as a default because the minimum cost indicates less change in cross-pixel differences between adjacent pixels (the current pixel and the lower and left pixels as explained in the example above), and over the pixel pattern (here, the cross-pattern). Thus, the minimum cost indicates a more consistent or uniform area in change of color, or more specifically consistent gradient, that is therefore more likely to be an edge in the vertical or horizontal direction.

Once the defaults are set, a test is performed to better ensure even more consistency with the surrounding pixels. Thus, the process 400 may include a first condition test, "Is current pixel (x, y) first pixel in the current row (0, y)?" 468 and in the row of pixels in an image. If so, then "use interpolation of default direction" 470. If not, then the process 400 continues with a second condition test, "Is previous pixel (x−1, 0) using default?" 472, and particularly, the previous pixel along the row or pixels in the image. In other words, is the previous pixel using the same default as set for current pixel (x, y). If so, then the default direction is used 470. If not, then a third condition is tested, "Is abs(MinCostH−MinCostV*10)>(MinCostH+MinCostV+1)?" 474. This generally tests whether the horizontal minimum cost is much smaller than the vertical minimum cost. If so, the default is used 470. If not, the process 400 may include "use interpolation method of previous pixel (x−1, 0)" 476. Another way to state this in pseudo code is:

If (pixel location (x, y) is the first pixel in the current row (0, y)), Interpolation method=Default;
Else if (Previous pixel (x−1, 0) use default), Interpolation method=Default;
Else if (abs(Min_cost_H−Min_cost_V)*10>(Min_cost_H+Min_cost_V+1)) Interpolation method=Default;
Else Interpolation method=Interpolation method for the previous pixel (x−1, 0);

The process 400 may continue to include "determine final horizontal or vertical interpolation value of current pixel based on initial interpolation values of current and adjacent pixels" 478. Thus, once the interpolation method for the current pixel is selected (either horizontal or vertical interpolation method) and used to calculate the initial interpolation value for the current pixel, a final interpolation value is established as a median value among (1) the interpolated value for the same color at the pixel location (x−1, y) and by whatever interpolation method was selected for that pixel location, (2) the current pixel location (x, y) and as calculated by the selected interpolation method for that location, and (3) the value of the pixel location (x+1, y) also generated by whatever interpolation method was used to obtain that interpolated value.

For the pixels with a direction map of no direction, the interpolated values are the final pixel values that may be used for further image processing. Otherwise, the process 400 may include "overwrite final horizontal or vertical interpolation values with average interpolation method color values if average interpolation method applies" 480. As mentioned above, the interpolated color values calculated using the average interpolation method are set as the final color values for the pixels that were found to be in an area without an edge and were assigned the average interpolation method in the Bayer domain.

Likewise, the process 400 may include "overwrite final horizontal or vertical interpolation values with color values generated by using horizontal or vertical interpolation methods alone when a final direction map of horizontal or vertical direction exists" 481. Thus, when a strong likelihood of a horizontal or vertical edge direction is detected in the Bayer domain, the assigned horizontal or vertical color values are used according to the final direction map form the Bayer domain instead of whichever interpolation method is finally assigned in the interpolation domain.

As a post-processing operation, where the term post-processing here is relative to the demosaicing process 400, the process 400 may include "determine bad pixels to revise" 482. This process attempts to remove outliers with a change from surrounding colors that is too large. This may include "determine interpolated value differences between current pixel and adjacent pixels, and differences of same color" 484. The process 400 may continue with "compare differences to a threshold" 486 where the threshold is determined from known methods and/or experimentation, and then "revise values of pixels with differences over the threshold" 488, and by known methods that need not be discussed here.

The process 400 may include "provide RGB pixel data for multiple pixels" 490, or in other words, provide the tri-color image data for a frame. The image data then may be pre-processed (relative to further processing) as needed, and then processed for display, storage, or encoding.

Figure 7:
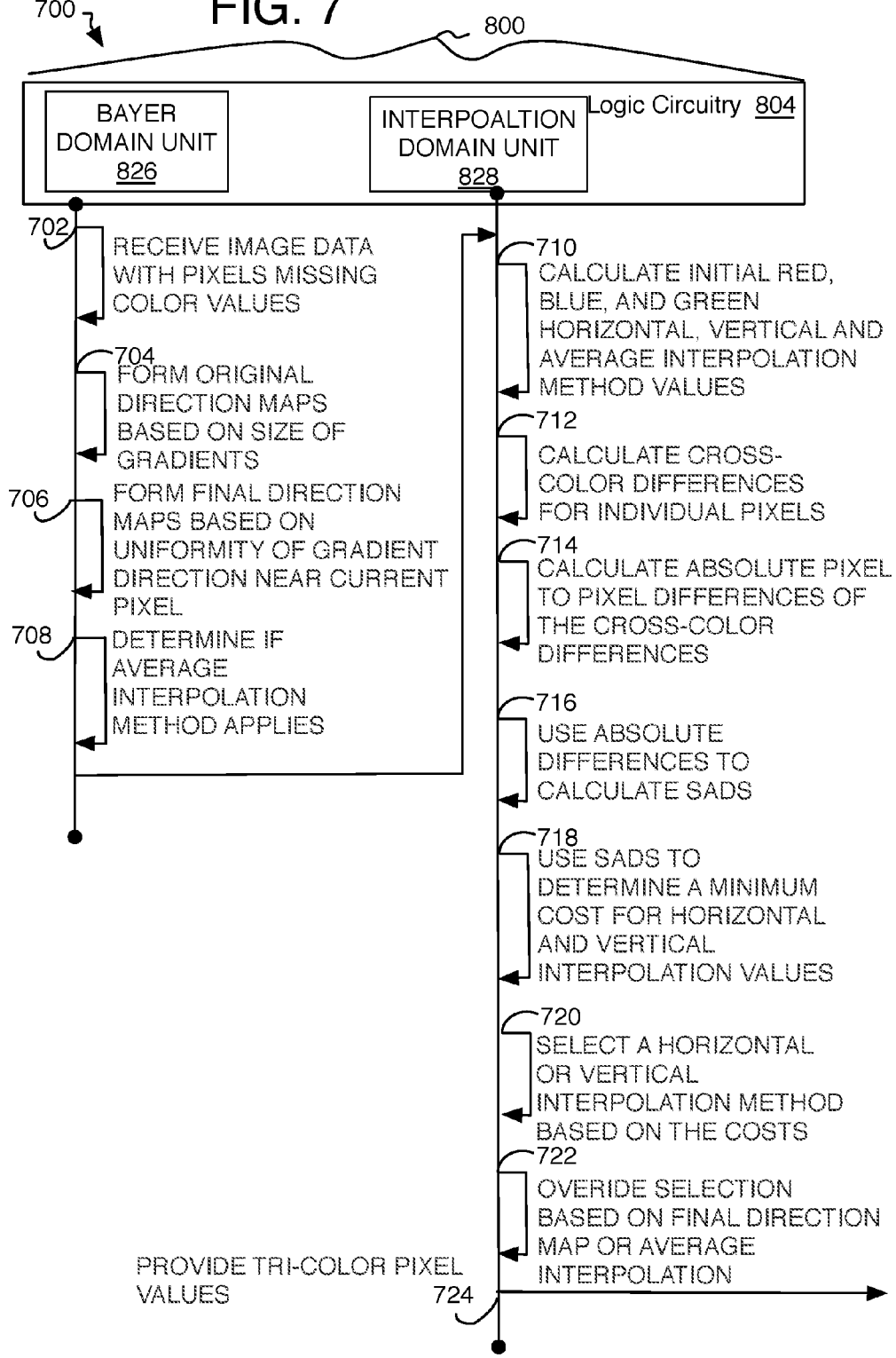
FIG. 7 is an illustrative diagram of an example system in operation for providing a demosaic method according to the implementations herein.

Referring to FIG. 7, process 700 illustrates the operation of a sample image processing system 800 that performs demosaicing of image data for image processing in accordance with at least some implementations of the present disclosure. In more detail, in the illustrated form, process 700 may include one or more operations, functions or actions as illustrated by one or more of actions 702 to 724 numbered evenly. By way of non-limiting example, process 700 will be described herein with reference to FIG. 8. Specifically, system 800 includes logic units 804 that may have a pre-processing unit 818, and could also have an encoder 820, and a decoder 822. In some different forms, the system 800 may only be an image capture device with the pre-processing unit and that provides raw data to a different device with an encoder and other coding or display modules. The pre-processing unit 818 may have a De-Mosaic unit 824 with a Bayer (or missing color)-space unit 826 and interpolation space unit 828. The operation of the system may proceed as follows.

Process 700 may include "receive image data with pixels missing color values" 702, and in one form, Bayer filter image data which may include an RG-GB pattern as described above.

Process 700 then may include "form original direction maps based on size of gradients" 704, and particularly, in the Bayer domain and as described above to calculate correlations, and then compare those correlations to determine whether the original direction map should be a horizontal direction, a vertical direction, or no direction (see equations (1) to (6) above as an example). This operation also may include a median test to determine whether a no direction pixel should be changed to horizontal or vertical direction depending on the number of original direction maps of horizontal or vertical directions in the surrounding pixels.

Process 700 may include "form final direction maps based on uniformity of gradient direction near current pixel" 706, and specifically, determine whether a contiguous or uniform area of pixels around the current pixel has direction maps of the same direction. If so, the final direction map is set as that direction (horizontal and vertical), and will be used as the final direction, and in turn interpolation method, regardless of what is determined during the interpolation domain.

Process 700 may include "determine if average interpolation method applies" 708, and particularly, to make an edge determination as to whether the current pixel is an area of uniform or flat color with little or no edge. If so, the average interpolation method is assigned to the pixel as the final selection of the interpolation method regardless of which method is selected for the pixel during the interpolation domain stage.

It will be understood that any of one or combination of these operations (704) to (708) rely on at least a first edge determination, whether it refers to a horizontal edge, a vertical edge, or detection that little or no edge exists.

Process 700 may include "calculate initial red, blue, and green horizontal, vertical, and average interpolation method values" 710, and according to the example equations above to form the interpolation domain where multiple, or each, pixel has color values for all three color components, and in this case, alternative color values for multiple interpolation methods such as the horizontal, vertical, and average interpolation methods.

Process 700 then may include "calculate cross-color differences for individual pixels" 712. As explained above, cross-color differences, between red and green, green and blue, and blue and red, are calculated for individual pixels. Then process 700 may include "calculate absolute pixel to pixel differences of the cross-color differences" 714, and as explained above, for each color component to determine continuity of gradients at least with adjacent pixels, such as one horizontally oriented and another vertically oriented relative to the current pixel. The differences for each color component is added together to create an absolute difference or sum. Thereafter, process 700 may include "use absolute differences to calculate SADs" 716, and by adding up the absolute differences on portions of a multi-pixel pattern, such as the cross-pattern 600 (FIG. 6). This all may be performed separately for the horizontal and vertical values (from the horizontal and vertical interpolation methods.

Process 700 then may include "use SADs to determine a minimum cost for horizontal and vertical interpolation values" 718, and particularly, the SADs are combined as described above to determine the two minimum costs. Then, process 700 may include "select a horizontal or vertical interpolation method based on the costs" 720, and depending on which direction has the lower minimum cost, the position of the current pixel along a row (or column) of pixels on an image, and the interpolation method of one or more pixels adjacent to the current pixel. Thus, the selection of an edge direction based on the minimum cost, which in turn is ultimately based on pixel-to-pixel differences of cross-color differences, may be considered a second edge determination performed in the interpolation domain and versus a first edge determination made in the Bayer domain.

Process 700 may include "override selection based on final direction map or average interpolation" 722, and as mentioned above, these are considered strong edge determinations that override the determination made in the interpolation domain. The process finally including "provide tri-color pixel values" 724, and as already described herein.

While implementation of example processes 200, 300, 400, and 700 may include the undertaking of all operations shown in the order illustrated, the present disclosure is not limited in this regard and, in various examples, implementation of any of the processes herein may include the undertaking of only a subset of the operations shown and/or in a different order than illustrated.

In addition, any one or more of the operations of processes 200, 300, 400, and 700 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions. "Hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 8:
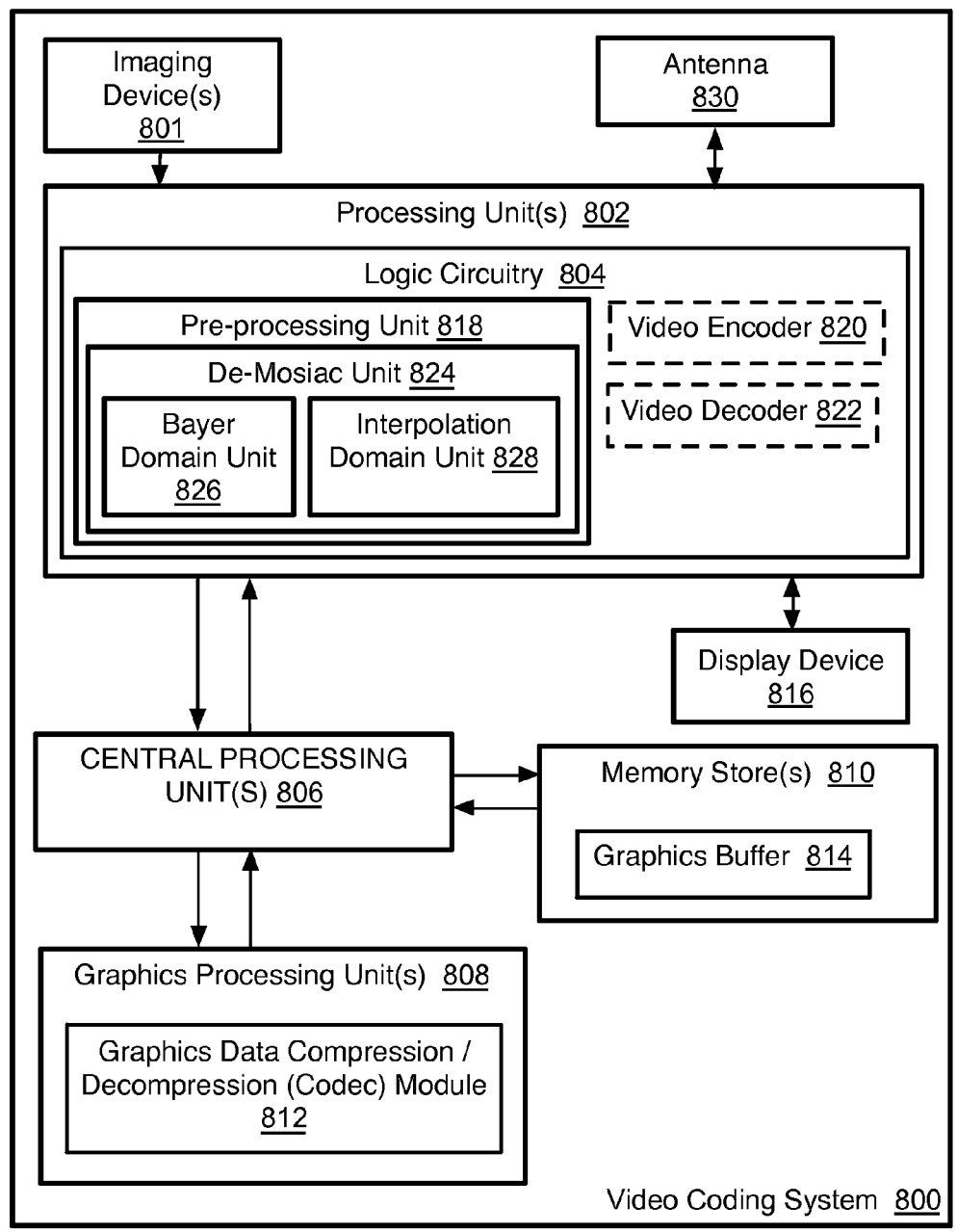
FIG. 8 is an illustrative diagram of an example system.

Referring to FIG. 8, an example image processing system 800 is arranged in accordance with at least some implementations of the present disclosure. In various implementations, the example image processing system 800 may have an imaging device 801 to form or receive captured image data. This can be implemented in various ways. Thus, in one form, the image processing system 800 may be a digital camera or other image capture device, and imaging device 801, in this case, may be the camera hardware and camera sensor software, module, or component. In other examples, imaging processing system 800 may have an imaging device 801 that includes or may be a camera, and logic modules 804 may communicate remotely with, or otherwise may be communicatively coupled to, the imaging device 801 for further processing of the image data. Imaging device 801 may be, or may be part of, a tablet with one or more cameras.

Such technology may include a camera such as a digital camera system, a dedicated camera device, or an imaging phone, whether a still picture or video camera or some combination of both. Thus, in one form, imaging device 801 may include camera hardware and optics including one or more sensors as well as auto-focus, zoom, aperture, ND-filter, auto-exposure, flash, and actuator controls. These controls may be part of a sensor module or component for operating the sensor on the imaging device 801. Thus, the imaging device 801 also may have a lens, an image sensor with a RGB Bayer color filter, an analog amplifier, an A/D converter, other components to convert incident light into a digital signal, the like, and/or combinations thereof. Other example forms include a camera sensor-type imaging device or the like (for example, a webcam or webcam sensor or other complementary metal-oxide-semiconductor-type image sensor (CMOS)).

The image device 801 may provide a digital signal including raw image data such as Bayer filter image data to a processing unit 802 and logic modules 804. In the illustrated example, the logic modules 804 may include a pre-processing unit 818 (where pre-processing is relative to display or coding of the image). The pre-processing unit 818 may include a de-mosaic unit 824, which in turn, may include a Bayer domain unit 826 and an interpolation domain unit 828, where each unit makes its own edge determinations. The logic circuitry also have an encoder 820, a decoder 822, both, or neither of these. The de-mosaicing unit 824 may be operated by, or even entirely or partially located at, central processing unit(s) 806 and/or graphics processing unit 808. The logic modules 804 may be communicatively coupled to the components of the imaging device 801 in order to receive raw image data. In these cases, it is assumed the logic modules 804 are considered to be separate from the imaging device 801. This need not be so, and the logic modules very well may be considered to be part of the imaging device 801 as well.

The image processing system 800 may have one or more processors 806 or 808 which may include a dedicated image signal processor (ISP) such as the Intel Atom, one or more displays 816 to provide images, and antenna 830. In one example implementation, the image processing system 800 may have the display 828, at least one processor 806 or 808 communicatively coupled to the display, at least one memory 810 with a graphics buffer 814 communicatively coupled to the processor to perform the operations described herein as explained above. The encoder 820 and antenna 830 may be provided to compress the modified image date for transmission to other devices that may display or store the image as well as provide motion data. It will be understood that the image processing system 800 may also include a decoder 822 (or encoder 820 may include a decoder) to receive and decode image data for processing by the system 800. The graphics processing unit(s) 808 may have a graphics data compression/decompression (codec) module 812 for these purposes. Otherwise, a processed image may be displayed on display 816 or stored in memory 810. As illustrated, any of these components may be capable of communication with one another and/or communication with portions of logic modules 804 and/or imaging device 801. Thus, processors 806 or 808 may be communicatively coupled to both the image device 801 and the logic modules 804 for operating those components. By one approach, although image processing system 800, as shown in FIG. 8, may include one particular set of blocks or actions associated with particular components or modules, these blocks or actions may be associated with different components or modules than the particular component or module illustrated here.

Figure 9:
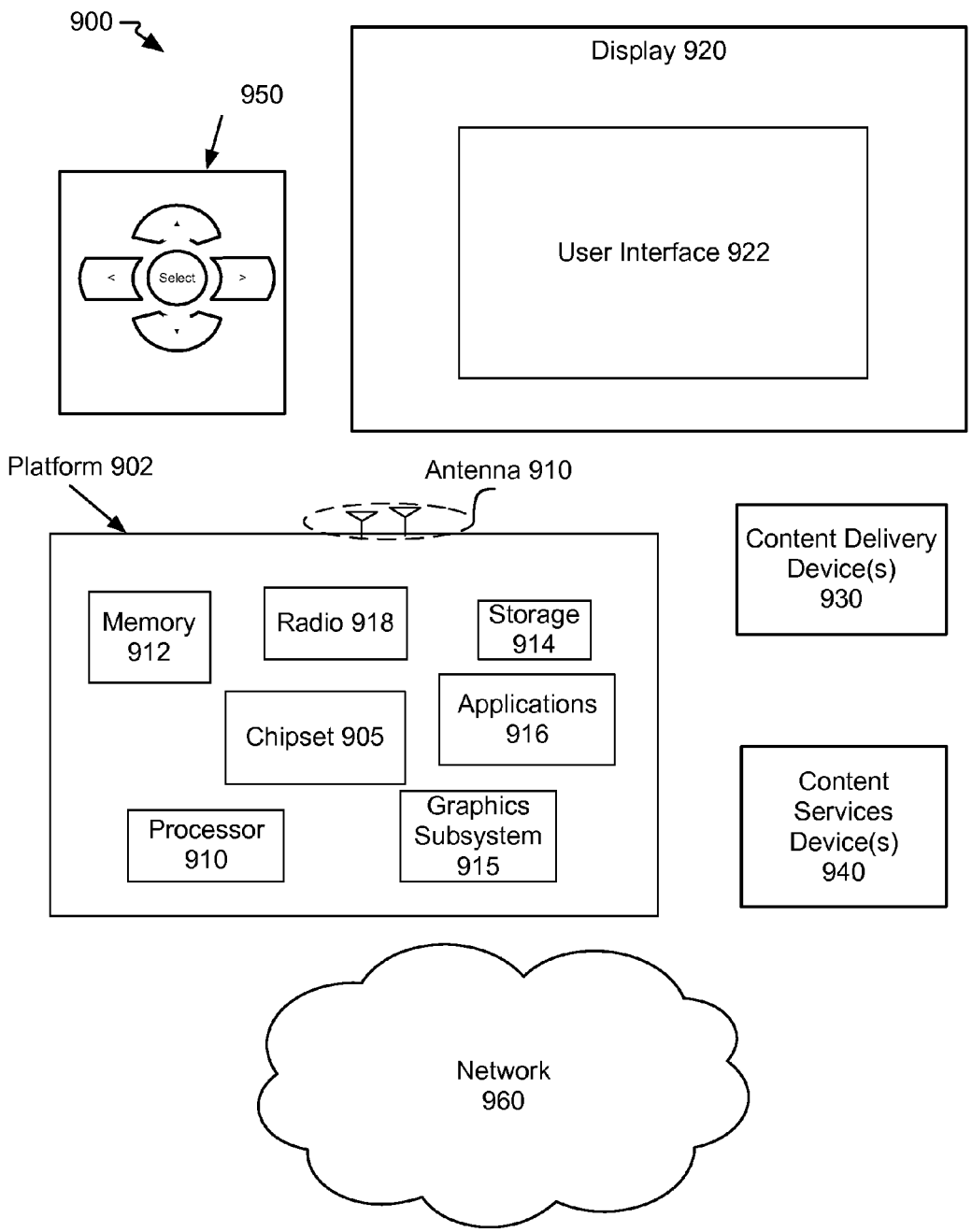
FIG. 9 is an illustrative diagram of another example system.

Referring to FIG. 9, an example system 900 in accordance with the present disclosure operates one or more aspects of the image processing system described herein. It will be understood from the nature of the system components described below that such components may be associated with, or used to operate, certain part or parts of the image processing system described above. In various implementations, system 900 may be a media system although system 900 is not limited to this context. For example, system 900 may be incorporated into one, or a network of, digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, Display Port, wireless HDMI, and/or wireless HD compliant techniques. Graphics subsystem 915 may be integrated into processor 910 or chipset 905. In some implementations, graphics subsystem 915 may be a stand-alone card communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television, and including a camera preview screen. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly. It will be appreciated that the content may be communicated unidirectionally and/or bidirectionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of controller 950 may be used to interact with user interface 922, for example. In implementations, navigation controller 950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 950 may be replicated on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In implementations, controller 950 may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off." In addition, chipset 905 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various implementations, platform 902 and display 920 may be an integrated unit. Display 920 and content service device(s) 930 may be integrated, or display 920 and content delivery device(s) 940 may be integrated, for example. These examples are not meant to limit the present disclosure.

In various implementations, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 9.

Figure 10:
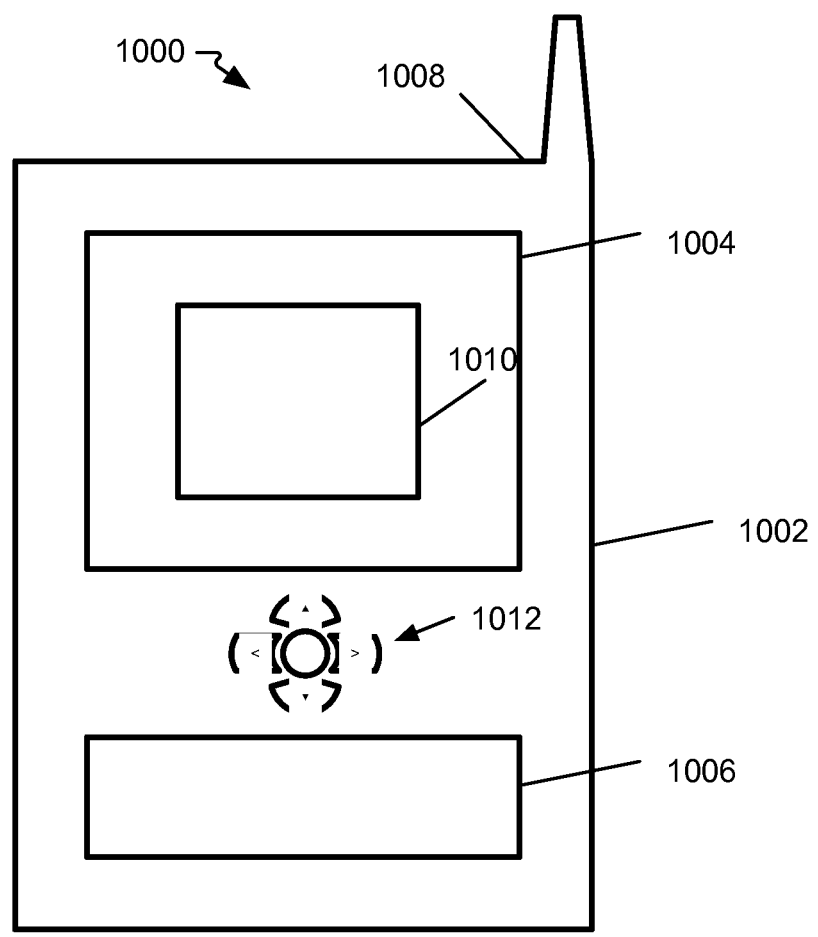
FIG. 10 illustrates another example device, all arranged in accordance with at least some implementations of the present disclosure.

Referring to FIG. 10, a small form factor device 1000 is one example of the varying physical styles or form factors in which system 900 may be embodied. By this approach, device 1000 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet with one or more cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 10, device 1000 may include a housing 1002, a display 1004 including a screen 1010, an input/output (I/O) device 1006, and an antenna 1008. Device 1000 also may include navigation features 1012. Display 1004 may include any suitable display unit for displaying information appropriate for a mobile computing device. I/O device 1006 may include any suitable I/O device for entering information into a mobile computing device. Examples for I/O device 1006 may include an alphanumeric keyboard, a numeric keypad, a touch pad, input keys, buttons, switches, rocker switches, microphones, speakers, voice recognition device and software, and so forth. Information also may be entered into device 1000 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores", may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of demosaicing Bayer-type image data comprises receiving pixel image data with pixels missing color values; forming a first edge determination of individual pixels by using pixels missing color values; generating initial color values to provide the missing color values and from alternative methods of interpolation; forming at least a second edge determination of the individual pixels using at least the initial color values; selecting a method of interpolation to use to calculate a final color value of the individual pixels and depending at least on the first and second edge determinations; and generating the final color values using the selected method of interpolation to provide the missing color values.

By another implementation, the method may comprise wherein an edge determination comprises using color value gradients near a current pixel to indicate (1) the likelihood of an edge of an object in content of an image existing at the current pixel or (2) the likelihood of the direction of the edge at the current pixel or (3) both (1) and (2); wherein forming at least a first edge determination comprises forming a direction map that indicates the direction of an edge at a current pixel if the edge is likely to exist, wherein forming a direction map comprises: at least comparing color value gradients in a horizontal direction near the current pixel to color value gradients in a vertical direction near the current pixel, forming direction maps of at least horizontal, vertical, or no direction, and changing a direction map of no direction at a current pixel to a direction map of horizontal or vertical when a median of the total number of pixels in an area near the current pixel has a horizontal or vertical direction map, and forming a final horizontal or vertical direction map comprising determining a minimum number of contiguous pixel locations in a pre-determined pattern and associated with a current pixel location and that uniformly has direction maps of either all horizontal or all vertical directions, wherein a method of interpolation is selected based on the final direction map regardless of which direction map is indicated by the second edge determination.

The method also comprising determining a difference in color value of the current pixel and surrounding pixels with the same color component, and comparing the differences to one or more thresholds to determine whether an average interpolation method should be applied to a pixel and while the pixels are missing color values, wherein the average interpolation method is selected regardless of which direction map is indicated by the second edge determination, wherein generating initial color values comprises generating the initial color values for pixels regardless of whether or not the first edge determination indicates a certain method of interpolation should be used for a pixel; and generating initial color values for horizontal, vertical, or average interpolation methods comprises modifying an initial average color value of the color component sought for a current pixel and modified by a gradient value of a different color component than that of the current pixel, wherein the average interpolation method comprises determining an average color value of average color values of pixels near a current pixel and of the color being sought for the current pixel and an average gradient of gradients nearby the current pixel; wherein the final interpolated value for a missing color value is a median value among a current final value and final values of two adjacent pixels regardless of the interpolation method used on the adjacent pixels.

By other approaches, the operations provided by the method may similarly be provided by a system, and particularly, a computer-implemented system that has a display, at least one memory to receive image data with pixels missing color values, at least one processor communicatively coupled to the at least one of the memories and displays, and at least one demosaicing unit operated by the at least one processor and to perform many or all of the operations provided by the method. Specifically, the demosaicing unit is to receive pixel image data with pixels missing color values; form a first edge determination of individual pixels by using pixels missing color values; generate initial color values to provide the missing color values and from alternative methods of interpolation; form at least a second edge determination of the individual pixels using at least the initial color values; select a method of interpolation to use to calculate a final color value of the individual pixels depending at least on the first and second edge directions; and determine the final color values using the selected method of interpolation to provide the missing color values.

By other approaches, the system may comprise the demosaicing unit to perform the operations wherein forming a second edge determination comprises determining cross-color differences between color values of different color components at individual pixels, and forming values for both the horizontal and vertical interpolation methods; wherein the demosaicing unit is to calculate absolute differences between cross-color differences from pixel to pixel and for values of both the horizontal and vertical interpolation methods, comprising: determining the difference in cross-color difference of the same color component from pixel to pixel, and for each color component, and summing the differences of the color components of each pixel to pixel comparison; wherein the demosaicing unit is to form sum of absolute differences (SADs) summing the absolute differences of pixels of multiple portions of a pixel pattern, and formed for values of both the horizontal and vertical interpolation methods, wherein the pattern is a cross-pattern where a current pixel is the center of the cross, and performed for values from both the horizontal and vertical interpolation methods; wherein the demosaicing unit is to form a minimum cost of the horizontal and vertical interpolations by using SADs respectively associated with the horizontal and vertical interpolation methods; wherein the demosaicing unit is to perform at least one of: form a minimum cost of a horizontal interpolation method comprising combining the minimum SAD of left and right arm portions of the cross-pattern to a portion of the minimum SAD of the upper or lower portions of the cross-pattern, and of the horizontal interpolation SADs, and form a minimum cost of a vertical interpolation method comprising combining the minimum SAD of upper or lower arm portions of the cross-pattern to a portion of the minimum SAD of the left or right portions of the cross-pattern, and of the vertical interpolation SADs; wherein forming the second edge determination comprises: selecting either a horizontal or vertical interpolation method to be used for a pixel depending, at least in part, on which of the horizontal or vertical interpolation methods has a lower minimum cost based, at least in part, on differences in cross-color differences from pixel to pixel, and selecting either a horizontal or vertical interpolation method to be used for a current pixel depending, at least in part, on at least one of: whether the current pixel is the first pixel in a row, whether at least a previous pixel in the row of the current pixel has the same of horizontal or vertical minimum cost as the lower cost, and whether the horizontal minimum cost is substantially lower than the vertical minimum cost, and wherein the minimum costs are based, at least in part, on differences in cross-color differences from pixel to pixel; wherein the final interpolated value for a missing color value is a median value among a current final value and final values of two adjacent pixels regardless of the interpolation method used on the adjacent pixels.

By one other approach, the features provided by the method and/or system may be provided by at least one computer readable medium that comprises a plurality of instructions that in response to being executed on a computing device, causes the computing device to perform any, some, or all of the operations that are performed by the method and/or the system.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of demosaicing Bayer-type image data comprising:
   receiving pixel image data with pixels missing color values;
   forming a first edge determination of individual pixels by using pixels missing color values;
   generating initially missed color values that are the missing color values and from alternative methods of interpolation;
   forming at least a second edge determination of the individual pixels using at least the initially missed color values;
   selecting a method of interpolation to use to calculate a final color value of the individual pixels and depending at least on the first and second edge determinations; and
   generating the final color values using the selected method of interpolation to provide the missing color values.

2. The method of claim 1 wherein an edge determination comprises using color value gradients near a current pixel to indicate (1) the likelihood of an edge of an object in content of an image existing at the current pixel or (2) the likelihood of the direction of the edge at the current pixel or (3) both (1) and (2).

3. The method of claim 1 wherein forming at least a first edge determination comprises forming a direction map that indicates the direction of an edge at a current pixel if the edge is likely to exist.

4. The method of claim 3 wherein forming a direction map comprises at least comparing color value gradients in a horizontal direction near the current pixel to color value gradients in a vertical direction near the current pixel.

5. The method of claim 3 wherein forming a direction map comprises:
   forming direction maps of at least horizontal, vertical, or no direction; and
   changing a direction map of no direction at a current pixel to a direction map of horizontal or vertical when a median of the total number of pixels in an area near the current pixel has a horizontal or vertical direction map.

6. The method of claim 3 wherein forming a direction map comprises forming a final horizontal or vertical direction map comprising determining a minimum number of contiguous pixel locations in a pre-determined pattern and associated with a current pixel location and that uniformly has direction maps of either all horizontal or all vertical directions.

7. The method of claim 6 wherein a method of interpolation is selected based on the final direction map regardless of which direction map is indicated by the second edge determination.

8. The method of claim 1 comprising determining a difference in color value of the current pixel and surrounding pixels with the same color component, and comparing the differences to one or more thresholds to determine whether an average interpolation method should be applied to a pixel and while the pixels are missing color values.

9. The method of claim 8 wherein the average interpolation method is selected regardless of which direction map is indicated by the second edge determination.

10. The method of claim 1 wherein generating initially missed color values comprises generating the initially missed color values for pixels regardless of whether or not the first edge determination indicates a certain method of interpolation should be used for a pixel.

11. The method of claim 1 wherein generating initially missed color values for horizontal, vertical, or average interpolation methods comprises modifying an initial average color value of the color component sought for a current pixel and modified by a gradient value of a different color component than that of the current pixel.

12. The method of claim 11 wherein the average interpolation method comprises determining an average color value of average color values of pixels near a current pixel and of the color being sought for the current pixel and an average gradient of gradients nearby the current pixel.

13. The method of claim 1 wherein an edge determination comprises using color value gradients near a current pixel to indicate (1) the likelihood of an edge of an object in content of an image existing at the current pixel or (2) the likelihood of the direction of the edge at the current pixel or (3) both (1) and (2);
   wherein forming at least a first edge determination comprises forming a direction map that indicates the direction of an edge at a current pixel if the edge is likely to exist, wherein forming a direction map comprises:
   at least comparing color value gradients in a horizontal direction near the current pixel to color value gradients in a vertical direction near the current pixel,
   forming direction maps of at least horizontal, vertical, or no direction, and
   changing a direction map of no direction at a current pixel to a direction map of horizontal or vertical when a median of the total number of pixels in an area near the current pixel has a horizontal or vertical direction map, and
   forming a final horizontal or vertical direction map comprising determining a minimum number of contiguous pixel locations in a pre-determined pattern and associated with a current pixel location and that uniformly has direction maps of either all horizontal or all vertical directions, wherein a method of interpolation is selected based on the final direction map regardless of which direction map is indicated by the second edge determination; the method comprising:
   determining a difference in color value of the current pixel and surrounding pixels with the same color component, and comparing the differences to one or more thresholds to determine whether an average interpolation method should be applied to a pixel and while the pixels are missing color values, wherein the average interpolation method is selected regardless of which direction map is indicated by the second edge determination, wherein generating initially missed color values comprises generating the initially missed color values for pixels regardless of whether or not the first edge determination indicates a certain method of interpolation should be used for a pixel; and
   generating initially missed color values for horizontal, vertical, or average interpolation methods comprises modifying an initial average color value of the color component sought for a current pixel and modified by a gradient value of a different color component than that of the current pixel, wherein the average interpolation method comprises determining an average color value of average color values of pixels near a current pixel and of the color being sought for the current pixel and an average gradient of gradients nearby the current pixel;

wherein the final interpolated value for a missing color value is a median value among a current final value and final values of two adjacent pixels regardless of the interpolation method used on the adjacent pixels.

14. A computer-implemented system comprising:
at least one display;
at least one memory to receive image data with pixels missing color values;
at least one processor communicatively coupled to at least one of the memories and displays; and
at least one demosaicing unit operated by the at least one processor and to:
receive pixel image data with pixels missing color values;
form a first edge determination of individual pixels by using pixels missing color values;
generate initially missed color values that are the missing color values and from alternative methods of interpolation;
form at least a second edge determination of the individual pixels using at least the initially missed color values;
select a method of interpolation to use to calculate a final color value of the individual pixels depending at least on the first and second edge directions; and
determine the final color values using the selected method of interpolation to provide the missing color values.

15. The system of claim 14 wherein forming a second edge determination comprises determining cross-color differences between color values of different color components at individual pixels, and forming values for both the horizontal and vertical interpolation methods.

16. The system of claim 15 wherein the demosaicing unit is to calculate absolute differences between cross-color differences from pixel to pixel and for values of both the horizontal and vertical interpolation methods, comprising:
determining the difference in cross-color difference of the same color component from pixel to pixel, and for each color component; and
summing the differences of the color components of each pixel to pixel comparison.

17. The system of claim 16 wherein the demosaicing unit is to form sum of absolute differences (SADs) summing the absolute differences of pixels of multiple portions of a pixel pattern, and formed for values of both the horizontal and vertical interpolation methods.

18. The system of claim 17 wherein the pattern is a cross-pattern where a current pixel is the center of the cross, and performed for values from both the horizontal and vertical interpolation methods.

19. The system of claim 18 wherein the demosaicing unit is to form a minimum cost of the horizontal and vertical interpolations by using SADs respectively associated with the horizontal and vertical interpolation methods.

20. The system of claim 19 wherein the demosaicing unit is to perform at least one of:
form a minimum cost of a horizontal interpolation method comprising combining the minimum SAD of left and right arm portions of the cross-pattern to a portion of the minimum SAD of the upper or lower portions of the cross-pattern, and of the horizontal interpolation SADs, and
form a minimum cost of a vertical interpolation method comprising combining the minimum SAD of upper or lower arm portions of the cross-pattern to a portion of the minimum SAD of the left or right portions of the cross-pattern, and of the vertical interpolation SADs.

21. The system of claim 14 wherein forming the second edge determination comprises selecting either a horizontal or vertical interpolation method to be used for a pixel depending, at least in part, on which of the horizontal or vertical interpolation methods has a lower minimum cost based, at least in part, on differences in cross-color differences from pixel to pixel.

22. The system of claim 14 wherein forming the second edge determination comprises selecting either a horizontal or vertical interpolation method to be used for a current pixel depending, at least in part, on at least one of:
whether the current pixel is the first pixel in a row,
whether at least a previous pixel in the row of the current pixel has the same of horizontal or vertical minimum cost as the lower cost, and
whether the horizontal minimum cost is substantially lower than the vertical minimum cost,
and wherein the minimum costs are based, at least in part, on differences in cross-color differences from pixel to pixel.

23. The system of claim 14, wherein forming a second edge determination comprises determining cross-color differences between color values of different color components at individual pixels, and forming values for both the horizontal and vertical interpolation methods;
wherein the demosaicing unit is to calculate absolute differences between cross-color differences from pixel to pixel and for values of both the horizontal and vertical interpolation methods, comprising:
determining the difference in cross-color difference of the same color component from pixel to pixel, and for each color component, and
summing the differences of the color components of each pixel to pixel comparison;
wherein the demosaicing unit is to form sum of absolute differences (SADs) summing the absolute differences of pixels of multiple portions of a pixel pattern, and formed for values of both the horizontal and vertical interpolation methods, wherein the pattern is a cross-pattern where a current pixel is the center of the cross, and performed for values from both the horizontal and vertical interpolation methods;
wherein the demosaicing unit is to form a minimum cost of the horizontal and vertical interpolations by using SADs respectively associated with the horizontal and vertical interpolation methods;
wherein the demosaicing unit is to perform at least one of:
form a minimum cost of a horizontal interpolation method comprising combining the minimum SAD of left and right arm portions of the cross-pattern to a portion of the minimum SAD of the upper or lower portions of the cross-pattern, and of the horizontal interpolation SADs, and
form a minimum cost of a vertical interpolation method comprising combining the minimum SAD of upper or lower arm portions of the cross-pattern to a portion of the minimum SAD of the left or right portions of the cross-pattern, and of the vertical interpolation SADs;
wherein forming the second edge determination comprises:
selecting either a horizontal or vertical interpolation method to be used for a pixel depending, at least in part, on which of the horizontal or vertical interpolation methods has a lower minimum cost based, at least in part, on differences in cross-color differences from pixel to pixel, and selecting either a horizontal or vertical interpolation method to be used for a current pixel depending, at least in part, on at least one of:

whether the current pixel is the first pixel in a row, whether at least a previous pixel in the row of the current pixel has the same of horizontal or vertical minimum cost as the lower cost, and whether the horizontal minimum cost is substantially lower than the vertical minimum cost, and wherein the minimum costs are based, at least in part, on differences in cross-color differences from pixel to pixel;

wherein the final interpolated value for a missing color value is a median value among a current final value and final values of two adjacent pixels regardless of the interpolation method used on the adjacent pixels.

24. A non-transitory computer-readable medium having stored thereon instructions that when executed cause a computing device to:

receive pixel image data with pixels missing color values;

form a first edge determination of individual pixels by using pixels missing color values;

generate initially missed color values that are the missing color values and from alternative methods of interpolation;

form at least a second edge determination of the individual pixels using at least the initially missed color values;

select a method of interpolation to use to calculate a final color value of the individual pixels and depending at least on the first and second edge determinations; and generate the final color values using the selected method of interpolation to provide the missing color values.

25. The non-transitory computer-readable medium of claim 24 wherein the computing device is to:

wherein an edge determination comprises using color value gradients near a current pixel to indicate (1) the likelihood of an edge of an object in content of an image existing at the current pixel or (2) the likelihood of the direction of the edge at the current pixel or (3) both (1) and (2);

wherein forming at least a first edge determination comprises forming a direction map that indicates the direction of an edge at a current pixel if the edge is likely to exist, wherein forming a direction map comprises:

at least comparing color value gradients in a horizontal direction near the current pixel to color value gradients in a vertical direction near the current pixel, forming direction maps of at least horizontal, vertical, or no direction, and changing a direction map of no direction at a current pixel to a direction map of horizontal or vertical when a median of the total number of pixels in an area near the current pixel has a horizontal or vertical direction map, and forming a final horizontal or vertical direction map comprising determining a minimum number of contiguous pixel locations in a pre-determined pattern and associated with a current pixel location and that uniformly has direction maps of either all horizontal or all vertical directions, wherein a method of interpolation is selected based on the final direction map regardless of which direction map is indicated by the second edge determination; the instructions causing the computing device to:

determine a difference in color value of the current pixel and surrounding pixels with the same color component, and comparing the differences to one or more thresholds to determine whether an average interpolation method should be applied to a pixel and while the pixels are missing color values, wherein the average interpolation method is selected regardless of which direction map is indicated by the second edge determination, wherein generating initially missed color values comprises generating the initially missed color values for pixels regardless of whether or not the first edge determination indicates a certain method of interpolation should be used for a pixel; and generate initially missed color values for horizontal, vertical, or average interpolation methods comprises modifying an initial average color value of the color component sought for a current pixel and modified by a gradient value of a different color component than that of the current pixel, wherein the average interpolation method comprises determining an average color value of average color values of pixels near a current pixel and of the color being sought for the current pixel and an average gradient of gradients nearby the current pixel;

wherein the final interpolated value for a missing color value is a median value among a current final value and final values of two adjacent pixels regardless of the interpolation method used on the adjacent pixels.

* * * * *